(12) United States Patent
Heikkila et al.

(10) Patent No.: US 9,376,552 B2
(45) Date of Patent: *Jun. 28, 2016

(54) CERAMIC COMPOSITE

(71) Applicant: Tundra Composites, LLC, White Bear Lake, MN (US)

(72) Inventors: Kurt E. Heikkila, Marine on the St. Croix, MN (US); Rodney K. Williams, Stacy, MN (US); John S. Kroll, Blaine, MN (US)

(73) Assignee: Tundra Composites, LLC, White Bear Lake, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/473,675

(22) Filed: Aug. 29, 2014

(65) Prior Publication Data

US 2015/0057402 A1 Feb. 26, 2015

Related U.S. Application Data

(63) Continuation of application No. 12/769,500, filed on Apr. 28, 2010, now Pat. No. 8,841,358.

(60) Provisional application No. 61/173,791, filed on Apr. 29, 2009.

(51) Int. Cl.
| | |
|---|---|
| *C08K 3/34* | (2006.01) |
| *C08K 9/00* | (2006.01) |
| *B60C 1/00* | (2006.01) |
| *C08K 3/22* | (2006.01) |
| *C08K 7/28* | (2006.01) |
| *C08K 9/04* | (2006.01) |
| *C08L 21/00* | (2006.01) |

(52) U.S. Cl.
CPC ... *C08K 9/00* (2013.01); *B60C 1/00* (2013.01); *C08K 3/22* (2013.01); *C08K 7/28* (2013.01); *C08K 9/04* (2013.01); *C08L 21/00* (2013.01); *Y10T 428/249974* (2015.04)

(58) Field of Classification Search
CPC .................................. C08K 13/00; C08K 3/34
USPC .......................................... 523/220; 524/444
See application file for complete search history.

(56) References Cited

U.S. PATENT DOCUMENTS

| | | | |
|---|---|---|---|
| 2,429,032 A | 10/1947 | Sheahan | |
| 2,723,238 A | 11/1955 | Simpkiss, Jr. | |
| 2,723,239 A | 11/1955 | Harvey | |
| 2,748,099 A | 5/1956 | Bruner et al. | |
| 2,847,395 A | 8/1958 | Wear | |
| 2,879,667 A | 3/1959 | Henderson | |
| 2,909,060 A | 10/1959 | Branick | |
| 2,958,165 A | 11/1960 | Hofmann | |
| 2,968,649 A | 1/1961 | Pailthorp et al. | |
| 2,995,788 A | 8/1961 | Sunday | |
| 3,002,388 A | 10/1961 | Bageman | |
| 3,137,045 A | 6/1964 | Sunday | |
| 3,177,039 A | 4/1965 | Skidmore | |
| 3,178,399 A | 4/1965 | Lo | |
| 3,289,483 A | 12/1966 | Slemmons | |
| 3,326,051 A | 6/1967 | Bageman et al. | |
| 3,365,315 A | 1/1968 | Beck et al. | |
| 3,379,057 A | 4/1968 | Hegenbart | |
| 3,382,908 A | 5/1968 | Palmquist et al. | |
| 3,424,127 A | 1/1969 | Johnson et al. | |
| 3,452,799 A | 7/1969 | Hindin et al. | |
| 3,474,677 A | 10/1969 | Roe | |
| 3,478,603 A | 11/1969 | Bonessa | |
| 3,493,257 A | 2/1970 | Fitzgerald et al. | |
| 3,616,126 A | 10/1971 | Tungseth | |
| 3,616,127 A | 10/1971 | Guenther | |
| 3,619,456 A | 11/1971 | Taylor | |
| 3,623,208 A | 11/1971 | Hofmann | |
| 3,663,328 A | 5/1972 | Turoczi, Jr. | |
| 3,669,500 A | 6/1972 | Ende | |
| 3,688,380 A | 9/1972 | Hofmann et al. | |
| 3,716,927 A | 2/1973 | Carter | |
| 3,740,257 A | 6/1973 | Roscher | |
| 3,741,016 A | 6/1973 | Hofmann | |
| 3,748,910 A | 7/1973 | Hofmann | |
| 3,786,850 A | 1/1974 | Turoczi, Jr. | |
| 3,793,656 A | 2/1974 | Carter et al. | |
| 3,843,591 A | 10/1974 | Hedrick et al. | |
| 3,894,169 A | 7/1975 | Miller | |
| 3,895,143 A | 7/1975 | Tarlow | |
| 3,901,845 A | 8/1975 | Newbould | |
| 3,905,648 A | 9/1975 | Skidmore | |
| 3,918,141 A | 11/1975 | Pepper | |
| 3,953,566 A | 4/1976 | Gore | |
| 3,960,409 A | 6/1976 | Songer | |
| 4,022,748 A | 5/1977 | Schlichting et al. | |
| 4,040,760 A | 8/1977 | Wyckoff | |
| 4,111,893 A | 9/1978 | Gasman et al. | |
| 4,157,325 A | 6/1979 | Charles et al. | |
| 4,168,259 A | 9/1979 | Coleman | |
| 4,169,185 A | 9/1979 | Bhatia | |

(Continued)

FOREIGN PATENT DOCUMENTS

| | | |
|---|---|---|
| CA | 1043393 | 11/1978 |
| CN | 1742045 A | 3/2006 |

(Continued)

OTHER PUBLICATIONS

"3M Flexible Magnet Tape Bendable. Bondable. Adaptable. Dependable," 3M Flexible Magnet Tape for versatile attachment solutions., http://solutions.3m.com/wps/portal/3M/en_US/3M-Industrial/Adhesives/Product/Fasteners/?WT.mc_id=www.3m.com/fasteners, 2 pages. (Copyright 2012).

(Continued)

*Primary Examiner* — Edward Cain

(57) ABSTRACT

The invention relates to a ceramic particulate and polymer composite having enhanced viscoelastic and rheological properties.

16 Claims, 1 Drawing Sheet

(56) References Cited

U.S. PATENT DOCUMENTS

| | | | |
|---|---|---|---|
| 4,173,930 | A | 11/1979 | Faires et al. |
| 4,178,277 | A | 12/1979 | Gebauer et al. |
| 4,187,390 | A | 2/1980 | Gore |
| 4,224,267 | A | 9/1980 | Lugosi et al. |
| 4,232,979 | A | 11/1980 | Johnson, Jr. et al. |
| 4,257,699 | A | 3/1981 | Lentz |
| 4,335,180 | A | 6/1982 | Traut |
| 4,340,319 | A | 7/1982 | Johnson, Jr. et al. |
| 4,418,186 | A | 11/1983 | Yamabe et al. |
| 4,569,978 | A | 2/1986 | Barber |
| 4,598,001 | A | 7/1986 | Watanabe et al. |
| 4,614,629 | A | 9/1986 | Economy |
| 4,740,538 | A | 4/1988 | Sekutowski |
| 4,780,981 | A | 11/1988 | Hayward et al. |
| 4,793,616 | A | 12/1988 | Fernandez |
| 4,886,689 | A | 12/1989 | Kotliar et al. |
| 4,891,399 | A | 1/1990 | Ohkawa et al. |
| 4,949,645 | A | 8/1990 | Hayward |
| 5,017,432 | A | 5/1991 | Eddy et al. |
| 5,019,311 | A | 5/1991 | Koslow |
| 5,026,748 | A | 6/1991 | Adams et al. |
| 5,061,965 | A | 10/1991 | Ferguson et al. |
| 5,073,320 | A | 12/1991 | Sterzel |
| 5,073,444 | A | 12/1991 | Shanelec et al. |
| 5,126,192 | A | 6/1992 | Chellis et al. |
| 5,130,342 | A | 7/1992 | Mcallister et al. |
| 5,141,273 | A | 8/1992 | Freeman |
| 5,147,722 | A | 9/1992 | Koslow |
| 5,198,295 | A | 3/1993 | Arthur et al. |
| 5,210,113 | A | 5/1993 | Waters |
| 5,214,088 | A | 5/1993 | Allen et al. |
| 5,214,106 | A | 5/1993 | Carlson et al. |
| 5,237,930 | A | 8/1993 | Belanger et al. |
| 5,265,925 | A | 11/1993 | Cox et al. |
| 5,278,219 | A | 1/1994 | Lilley et al. |
| 5,286,802 | A | 2/1994 | Uesugi et al. |
| 5,289,997 | A | 3/1994 | Harris |
| 5,342,573 | A | 8/1994 | Amano et al. |
| 5,354,611 | A | 10/1994 | Arthur et al. |
| 5,373,047 | A | 12/1994 | Schnelle et al. |
| 5,378,407 | A | 1/1995 | Chandler et al. |
| 5,384,345 | A | 1/1995 | Naton |
| 5,399,187 | A | 3/1995 | Mravic et al. |
| 5,418,293 | A | 5/1995 | Numa et al. |
| 5,506,049 | A | 4/1996 | Swei et al. |
| 5,548,125 | A | 8/1996 | Sandbank |
| 5,591,279 | A | 1/1997 | Midorikawa et al. |
| 5,594,186 | A | 1/1997 | Krause et al. |
| 5,616,642 | A | 4/1997 | West et al. |
| 5,620,775 | A | 4/1997 | Laperre |
| 5,631,053 | A | 5/1997 | Andersen et al. |
| 5,639,838 | A | 6/1997 | Albano et al. |
| 5,660,903 | A | 8/1997 | Andersen et al. |
| 5,674,930 | A | 10/1997 | Sugiura |
| 5,674,931 | A | 10/1997 | Gallagher et al. |
| 5,696,216 | A | 12/1997 | Kruger et al. |
| 5,705,242 | A | 1/1998 | Andersen et al. |
| 5,712,003 | A | 1/1998 | Suenaga et al. |
| 5,786,416 | A | 7/1998 | Gardner et al. |
| 5,866,647 | A | 2/1999 | Massey et al. |
| 5,877,437 | A | 3/1999 | Oltrogge |
| 5,922,453 | A | 7/1999 | Horn, III et al. |
| 5,959,205 | A | 9/1999 | Yamaya et al. |
| 6,048,379 | A | 4/2000 | Bray et al. |
| 6,074,576 | A | 6/2000 | Zhao et al. |
| 6,090,313 | A | 7/2000 | Zhao |
| 6,128,952 | A | 10/2000 | Leblanc |
| 6,168,226 | B1 | 1/2001 | Wycech |
| 6,177,533 | B1 | 1/2001 | Woodward |
| 6,180,037 | B1 | 1/2001 | Andersen et al. |
| 6,196,863 | B1 | 3/2001 | Schwant |
| 6,204,303 | B1 | 3/2001 | Osuna et al. |
| 6,204,971 | B1 | 3/2001 | Morris et al. |
| 6,217,413 | B1 | 4/2001 | Christianson |
| 6,270,549 | B1 | 8/2001 | Amick |
| 6,308,999 | B1 | 10/2001 | Tan et al. |
| 6,318,775 | B1 | 11/2001 | Heatherington et al. |
| 6,346,565 | B1 | 2/2002 | Daifuku et al. |
| 6,364,421 | B1 | 4/2002 | Pursley |
| 6,364,422 | B1 | 4/2002 | Sakaki et al. |
| 6,371,532 | B1 | 4/2002 | Skarie et al. |
| 6,406,078 | B1 | 6/2002 | Wycech |
| 6,411,248 | B1 | 6/2002 | Barbour et al. |
| 6,413,626 | B1 | 7/2002 | Wollner |
| 6,457,417 | B1 | 10/2002 | Beal |
| 6,482,519 | B1 | 11/2002 | Schleifstein et al. |
| 6,514,595 | B1 | 2/2003 | Sprouts |
| 6,515,066 | B2 | 2/2003 | Allen et al. |
| 6,517,774 | B1 | 2/2003 | Bray et al. |
| 6,525,125 | B1 | 2/2003 | Giardello et al. |
| 6,553,831 | B1 | 4/2003 | Schmidt et al. |
| 6,562,290 | B2 | 5/2003 | Meinhardt et al. |
| 6,576,697 | B1 | 6/2003 | Brown et al. |
| 6,578,431 | B2 | 6/2003 | Dillard et al. |
| 6,623,849 | B2 | 9/2003 | Meguro et al. |
| 6,672,635 | B2 | 1/2004 | Weissenborn et al. |
| 6,695,366 | B2 | 2/2004 | Cherry |
| 6,727,339 | B2 | 4/2004 | Luginsland et al. |
| 6,732,807 | B2 | 5/2004 | Poynton |
| 6,740,260 | B2 | 5/2004 | Mccord |
| 6,815,066 | B2 | 11/2004 | Elliott |
| 6,815,484 | B2 | 11/2004 | Scholl et al. |
| 6,849,338 | B2 | 2/2005 | Clemens et al. |
| 6,866,313 | B2 | 3/2005 | Mooijman et al. |
| 6,884,844 | B2 | 4/2005 | Hamilton et al. |
| 6,913,863 | B2 | 7/2005 | Wu et al. |
| 6,916,354 | B2 | 7/2005 | Elliott |
| 6,916,863 | B2 | 7/2005 | Hemmings et al. |
| 6,960,626 | B2 | 11/2005 | Takekoshi et al. |
| 6,962,181 | B2 | 11/2005 | Deevers et al. |
| 6,972,144 | B2 | 12/2005 | Roth et al. |
| 6,981,996 | B2 | 1/2006 | Shaner et al. |
| 6,983,964 | B2 | 1/2006 | Murata et al. |
| 6,994,925 | B2 | 2/2006 | Masaki |
| 7,007,990 | B2 | 3/2006 | Van Damme et al. |
| 7,015,271 | B2 | 3/2006 | Bice et al. |
| 7,037,865 | B1 | 5/2006 | Kimberly |
| 7,069,990 | B1 | 7/2006 | Bilak |
| 7,083,695 | B2 | 8/2006 | Vannan et al. |
| 7,086,690 | B2 | 8/2006 | Shuler et al. |
| 7,121,955 | B2 | 10/2006 | Stevens et al. |
| 7,164,197 | B2 | 1/2007 | Mao et al. |
| 7,169,489 | B2 | 1/2007 | Redmond |
| 7,176,269 | B2 | 2/2007 | Hakuta et al. |
| 7,204,191 | B2 | 4/2007 | Wiley et al. |
| 7,213,519 | B2 | 5/2007 | Wiley et al. |
| 7,216,938 | B2 | 5/2007 | Phillips |
| 7,217,389 | B2 | 5/2007 | Amick |
| 7,230,044 | B2 | 6/2007 | Takekoshi et al. |
| 7,232,473 | B2 | 6/2007 | Elliott |
| 7,249,804 | B2 | 7/2007 | Zank et al. |
| 7,324,261 | B2 | 1/2008 | Tonar et al. |
| 7,354,968 | B2 | 4/2008 | Nishikawa et al. |
| 7,356,390 | B2 | 4/2008 | Knoblach et al. |
| 7,370,893 | B2 | 5/2008 | Tamada et al. |
| 7,406,990 | B2 | 8/2008 | Brown et al. |
| 7,449,224 | B2 | 11/2008 | Ensinger |
| 7,478,849 | B2 | 1/2009 | Fortin |
| 7,491,356 | B2 | 2/2009 | Heikkila |
| 7,507,480 | B2 | 3/2009 | Sugama |
| 7,511,102 | B2 | 3/2009 | Hasegawa et al. |
| 7,524,910 | B2 | 4/2009 | Jiang et al. |
| 7,528,189 | B2 | 5/2009 | Taylor et al. |
| 7,531,583 | B2 | 5/2009 | Desai |
| 7,533,912 | B2 | 5/2009 | Frederick et al. |
| 7,552,955 | B2 | 6/2009 | Evans |
| 7,559,348 | B2 | 7/2009 | Puhala et al. |
| 7,589,284 | B2 | 9/2009 | Severance et al. |
| 7,612,929 | B2 | 11/2009 | Tonar et al. |
| 7,622,529 | B2 | 11/2009 | Walton et al. |
| 7,628,971 | B2 | 12/2009 | Stenzel et al. |
| 7,645,829 | B2 | 1/2010 | Tse et al. |
| 7,649,029 | B2 | 1/2010 | Kolb et al. |
| 7,666,933 | B2 | 2/2010 | Wu |

(56) References Cited

U.S. PATENT DOCUMENTS

| | | |
|---|---|---|
| 7,671,227 B2 | 3/2010 | Dawes et al. |
| 7,789,117 B2 | 9/2010 | Puhala et al. |
| 7,790,131 B2 | 9/2010 | Stenzel et al. |
| 7,841,669 B2 | 11/2010 | Zank |
| 7,878,599 B2 | 2/2011 | Astorino et al. |
| 7,883,156 B2 | 2/2011 | Pursley et al. |
| 7,906,587 B2 | 3/2011 | Poon et al. |
| 7,954,864 B2 | 6/2011 | Frederick et al. |
| 7,977,432 B2 | 7/2011 | Bening et al. |
| 7,989,068 B2 | 8/2011 | Rao et al. |
| 8,034,443 B2 | 10/2011 | Eder |
| 8,084,537 B2 | 12/2011 | Walton et al. |
| 8,086,611 B2 | 12/2011 | Van Vleck et al. |
| 8,106,105 B2 | 1/2012 | Cernohous |
| 8,181,580 B2 | 5/2012 | Roth et al. |
| 8,210,212 B2 | 7/2012 | Buchner |
| 8,272,412 B2 | 9/2012 | Bergman et al. |
| 8,309,659 B2 | 11/2012 | Masarati et al. |
| 8,316,903 B2 | 11/2012 | Majumdar et al. |
| 8,357,727 B2 | 1/2013 | Strandburg et al. |
| 8,487,034 B2 | 7/2013 | Heikkila et al. |
| 8,841,358 B2 * | 9/2014 | Heikkila et al. .............. 523/220 |
| 2001/0050020 A1 | 12/2001 | Davis et al. |
| 2002/0000275 A1 | 1/2002 | Fogal, Sr. |
| 2002/0079707 A1 | 6/2002 | Skarie et al. |
| 2002/0114940 A1 | 8/2002 | Clemens et al. |
| 2002/0124759 A1 | 9/2002 | Amick |
| 2002/0153144 A1 | 10/2002 | Weaver |
| 2002/0195257 A1 | 12/2002 | Poynton |
| 2002/0198286 A1 | 12/2002 | Igarashi et al. |
| 2003/0027005 A1 | 2/2003 | Elliott |
| 2003/0045619 A1 | 3/2003 | Scholl et al. |
| 2003/0065070 A1 | 4/2003 | Nishida |
| 2003/0069344 A1 | 4/2003 | Nishikawa et al. |
| 2003/0109614 A1 | 6/2003 | Luginsland et al. |
| 2003/0130418 A1 | 7/2003 | Hamilton et al. |
| 2003/0133193 A1 | 7/2003 | Martinez |
| 2003/0143099 A1 | 7/2003 | Amick |
| 2003/0155055 A1 | 8/2003 | Leblanc |
| 2003/0161751 A1 | 8/2003 | Elliott |
| 2003/0164063 A1 | 9/2003 | Elliott |
| 2004/0023087 A1 | 2/2004 | Redmond |
| 2004/0032638 A1 | 2/2004 | Tonar et al. |
| 2004/0118496 A1 | 6/2004 | Vannan et al. |
| 2004/0127614 A1 | 7/2004 | Jiang et al. |
| 2004/0135384 A1 | 7/2004 | Pritchard et al. |
| 2004/0140042 A1 | 7/2004 | Teratani et al. |
| 2004/0159386 A1 | 8/2004 | Deevers et al. |
| 2004/0174024 A1 | 9/2004 | Murata et al. |
| 2004/0177720 A1 | 9/2004 | Shaner et al. |
| 2004/0220307 A1 | 11/2004 | Wu |
| 2004/0220321 A1 | 11/2004 | Bataille et al. |
| 2005/0005807 A1 | 1/2005 | Wiley et al. |
| 2005/0014499 A1 | 1/2005 | Knoblach et al. |
| 2005/0043112 A1 | 2/2005 | Stevens et al. |
| 2005/0062332 A1 | 3/2005 | Amyot et al. |
| 2005/0153610 A1 | 7/2005 | Mccarthy et al. |
| 2005/0167019 A1 | 8/2005 | Puhala et al. |
| 2005/0188879 A1 | 9/2005 | Wiley et al. |
| 2005/0258404 A1 | 11/2005 | Mccord |
| 2006/0016535 A1 | 1/2006 | Mauclin et al. |
| 2006/0020086 A1 | 1/2006 | Smith |
| 2006/0029795 A1 | 2/2006 | Sawyer et al. |
| 2006/0043743 A1 | 3/2006 | Shuler et al. |
| 2006/0055077 A1 | 3/2006 | Heikkila |
| 2006/0075919 A1 | 4/2006 | Wiley et al. |
| 2006/0099129 A1 | 5/2006 | Stenzel et al. |
| 2006/0102041 A1 | 5/2006 | Wiley et al. |
| 2006/0105053 A1 | 5/2006 | Marx et al. |
| 2006/0118211 A1 | 6/2006 | Elliott |
| 2006/0118311 A1 | 6/2006 | Serritella et al. |
| 2006/0137575 A1 | 6/2006 | Stenzel et al. |
| 2006/0199906 A1 | 9/2006 | Walton et al. |
| 2007/0005818 A1 | 1/2007 | Tsuruoka et al. |
| 2007/0021566 A1 | 1/2007 | Tse et al. |
| 2007/0034311 A1 | 2/2007 | Brown et al. |
| 2007/0066756 A1 | 3/2007 | Poon et al. |
| 2007/0113759 A1 | 5/2007 | Roth et al. |
| 2007/0161732 A1 | 7/2007 | Hasegawa et al. |
| 2007/0175557 A1 | 8/2007 | Puhala et al. |
| 2007/0207186 A1 | 9/2007 | Scanlon et al. |
| 2007/0236938 A1 | 10/2007 | Ouderkirk et al. |
| 2008/0049295 A1 | 2/2008 | Tonar et al. |
| 2008/0063850 A1 | 3/2008 | Vilchis Ramirez et al. |
| 2008/0069852 A1 | 3/2008 | Shimp et al. |
| 2008/0098935 A1 | 5/2008 | Roth et al. |
| 2008/0139722 A1 | 6/2008 | Shefelbine et al. |
| 2008/0139731 A1 | 6/2008 | Lawson et al. |
| 2008/0160302 A1 | 7/2008 | Asrar et al. |
| 2008/0171828 A1 | 7/2008 | Bening et al. |
| 2008/0207937 A1 | 8/2008 | Dawes et al. |
| 2008/0245460 A1 | 10/2008 | Brown et al. |
| 2008/0275151 A1 | 11/2008 | Strandburg et al. |
| 2008/0293871 A1 | 11/2008 | Stenzel et al. |
| 2008/0299990 A1 | 12/2008 | Knoblach et al. |
| 2008/0315453 A1 | 12/2008 | Molitor et al. |
| 2009/0032088 A1 | 2/2009 | Rabinowitz |
| 2009/0039661 A1 | 2/2009 | Frederick et al. |
| 2009/0068363 A1 | 3/2009 | Smetana |
| 2009/0078353 A1 | 3/2009 | Majumdar et al. |
| 2009/0084042 A1 | 4/2009 | Ramanath et al. |
| 2009/0084482 A1 | 4/2009 | Majumdar et al. |
| 2009/0084483 A1 | 4/2009 | Majumdar et al. |
| 2009/0087661 A1 | 4/2009 | Eder |
| 2009/0101225 A1 | 4/2009 | Buchner |
| 2009/0105417 A1 | 4/2009 | Walton et al. |
| 2009/0127801 A1 | 5/2009 | Heikkila |
| 2009/0127919 A1 | 5/2009 | Burnett |
| 2009/0133793 A1 | 5/2009 | Bergman et al. |
| 2009/0136754 A1 | 5/2009 | Rao et al. |
| 2009/0227792 A1 | 9/2009 | Briehn et al. |
| 2009/0242091 A1 | 10/2009 | Puhala et al. |
| 2009/0254171 A1 | 10/2009 | Heikkila |
| 2009/0255613 A1 | 10/2009 | Zhang et al. |
| 2009/0303593 A1 | 12/2009 | Sagar et al. |
| 2009/0314482 A1 | 12/2009 | Heikkila |
| 2009/0315214 A1 | 12/2009 | Heikkila |
| 2009/0324875 A1 | 12/2009 | Heikkila |
| 2010/0016459 A1 | 1/2010 | Cernohous |
| 2010/0048807 A1 | 2/2010 | Masarati et al. |
| 2010/0279100 A1 | 11/2010 | Heikkila et al. |
| 2010/0280145 A1 | 11/2010 | Heikkila et al. |
| 2010/0280164 A1 | 11/2010 | Heikkila et al. |
| 2010/0291374 A1 | 11/2010 | Akarsu et al. |
| 2013/0130026 A1 | 5/2013 | Heikkila et al. |
| 2013/0157053 A1 | 6/2013 | Heikkila et al. |

FOREIGN PATENT DOCUMENTS

| | | |
|---|---|---|
| CN | 1902271 A | 1/2007 |
| CN | 101959946 A | 1/2011 |
| CN | 102421839 | 4/2012 |
| DE | 130863 | 5/1978 |
| DE | 10254877 | 6/2004 |
| DE | 2006012954 | 11/2006 |
| EP | 0287045 | 10/1988 |
| EP | 0376461 | 7/1990 |
| EP | 1150311 | 10/2001 |
| EP | 1752491 | 2/2007 |
| EP | 1762751 | 3/2007 |
| FR | 1248939 | 11/1960 |
| FR | 1308945 | 10/1962 |
| FR | 1530795 | 5/1968 |
| GB | 827308 | 2/1960 |
| GB | 836316 | 6/1960 |
| GB | 838857 | 6/1960 |
| GB | 911275 | 11/1962 |
| GB | 914753 | 1/1963 |
| GB | 964937 | 7/1964 |
| GB | 974764 | 11/1964 |
| GB | 1246829 | 9/1971 |
| GB | 1259481 | 1/1972 |
| GB | 2179664 | 3/1987 |
| JP | 63273664 | 11/1988 |

(56) References Cited

FOREIGN PATENT DOCUMENTS

| | | |
|---|---|---|
| JP | 02022375 | 1/1990 |
| JP | 02219872 | 9/1990 |
| JP | 06226771 | 8/1994 |
| JP | 06328908 | 11/1994 |
| JP | 07258475 | 10/1995 |
| JP | 11172162 | 6/1999 |
| JP | 2000191749 | 7/2000 |
| JP | 2000256569 | 9/2000 |
| JP | 2001015319 | 1/2001 |
| JP | 2001030697 | 2/2001 |
| JP | 2001041290 | 2/2001 |
| JP | 2001110620 | 4/2001 |
| JP | 2001123011 | 5/2001 |
| JP | 2001123067 | 5/2001 |
| JP | 2001183099 | 6/2001 |
| JP | 2001349381 | 12/2001 |
| JP | 2002013592 | 1/2002 |
| JP | 2002257499 | 9/2002 |
| JP | 2007297432 | 11/2007 |
| WO | 8505113 | 11/1985 |
| WO | 9305101 | 3/1993 |
| WO | 9800462 | 1/1998 |
| WO | 02086347 | 10/2002 |
| WO | 03029343 | 4/2003 |
| WO | 2005012408 | 2/2005 |
| WO | 2005049764 | 6/2005 |
| WO | 2005049714 A2 | 8/2005 |
| WO | 2007094764 | 8/2007 |
| WO | 2007134788 | 11/2007 |
| WO | 2008022781 | 2/2008 |
| WO | 2009091987 | 7/2009 |
| WO | 2010127101 | 11/2010 |
| WO | 2010127106 | 11/2010 |
| WO | 2010127117 | 11/2010 |

OTHER PUBLICATIONS

Arkles, "Gelest Silane Coupling Agents: Connectiong Across Boundaries," Gelest, Inc., Cover Page, (pp. 1-20)) (Copyright 2003).

Bhowmiket, et al., "Influence of Mineral Polymer Interactions on Molecular Mechanics of Polymer in Composite Bone Biomaterials," Materials Research Society, http://www.mrs.org/s_mrs/sec_subscribe.asp?CID=7637&DID=194200&action=detail, 2 pgs (Date Printed Aug. 11, 2008).

Bose, et al., "Effect of Flash on the Mechanical, Thermal, Dielectric, Rheological and Morphological Properties of Filled Nylon 6," Journal of Minerals & Materials Characterization & Engineering, vol. 3, No. 2., (pp. 65-72) (2004).

Bose, et al., "Effect of Particle Size of Filler on Properties of Nylon-6," Journal of Minerals & Materials characterization & Engineering, vol. 3, No. 1, (pp. 23-31) (2004).

"Bridging the Gap with Coupling Agents," Article of the Week by SpecialChem, http://www.specialchem4polymers.com/2456/eng/article.aspx?id=1355, (pp. 1-7) (Aug. 25, 2003).

"Characterization and Failure Analysis of Plastics," ASM International, (2003) (5 pgs).

Cheney, Richard F. "Production of Tungsten, Molybdenum, and Carbide Powders," Chemical and Metallurgical Division GTE Products Corporation (Date Unknown), (pp. 152-159).

Cho, et al., "Some Observations on the Tribological Performance of Polymer Composites Filled with Minerals from Armenia," Wear and Tribology, http://ses.confex.com/ses/2004tm/techprogram/P1371. HTM, 1 pg. (Oct. 12, 2004).

Coleman, M M. et al., "Infrared Spectroscopy: Applicatoins to Chemical Systems," vol. 4, Academic Press, Inc., New York, (pp. 469-472), (1978).

"Communication Pursuant to Article 94(3) EPC," for European Patent Application No. 10719163.7, mailed Nov. 19, 2014 (4 pages).

"Composite Material," Wikipedia, the free encyclopedia, http://en.wikipedia.org/wiki/Composite_material, pp. 1-5 (Aug. 11, 2008).

"Decision on Rejection," from CN Application No. 201080018729.1, mailed Sep. 26, 2013 (17 pages).

"Declaration of Rodney Williams," for Application No. 492.0018USU1, dated Jun. 13, 2013, 7 pages.

Depass, Dee "Getting the Lead Out: Alliant's 'Green' Bullet," Star Tribune. Startribune.com. Published Sep. 3, 2003, 3 pgs.

Dow Corning, "A Guide to Silane Solutions," Dow Corning Corporation (30 pages) www.dowcorning.com 2005.

"DuPont Teflon Aqueous Dispersions," Product Information; copyright 2014.

"DuPont Teflon PTFE 6C Fluoropolymer Resin (PTFE Fine Powder)," Product Information, K-25657, May 2012 (2 pages).

"DuPont(TM) Teflon PTFE 6C, fluoropolymer resin," DuPont (May 2005).

"Dyneon Flouroplastics Product Comparison Guide" Dyneon LLC (A 3M Company) (10 pages) Jun. 2003.

"Dyneon Fluoroelastomers: Processing Fluoroelastomers," Dyneon a 3M Company. Jan. 2001, 8 pgs.

"Dyneon Fluorothermoplastics FEP X 6301, FEP X 6303 and FEP X 6307," Dyneon a 3M Company. Aug. 2001, 2 pgs.

"Dyneon Fluorothermoplastics Product Information," Dyneon a 3M Company. Dec. 2000, 2 pgs.

"Dyneon Fluorothermoplastics THV 220A," Dyneon a 3M Company. Aug. 2001, 2 pgs.

"Dyneon THV 221AZ Ultra Flexible THV in Aggolomerate Form," Dyneon a 3M Company. Mar. 2009, 2 pgs.

"Dyneon THV Fluorothermoplastics Injection Molding Guidelines," Dyneon a 3M Company. Apr. 2001, 2 pgs.

Ebnesajjad, Sina et al., "Fluoropolymers: Applications in Chemical Processing Industries," DuPont Fluoroproducts, 2004 (16 pages).

"Ecomass Compounds Product Data Sheet: PEM-01-01-110-LTS," PolyOne Corporation. Apr. 26, 2002. (1 page).

"Ecomass Compounds Product Data Sheet: PEM-07-01-090-LTS," PolyOne Corporation. Apr. 26, 2002. 1 pg.

"Ellis, Bryan and Smith Ray (edited by), "Polymers, A Property Database, Second Edition",," CRC Press, 2009, 4 pages.

"European Search Report," for European Patent Application No. 10 18 2628, dated Nov. 3, 2010, entitled "Metal Polymer Composite, a Method for its Extrusion and Shaped Articles Therefrom" (9 pages).

"European Search Report," for European Patent Application No. 10 18 2673, dated Nov. 3, 2010, entitled "Metal Polymer Composite, a Method for its Extrusion and Shaped Articles Made Therefrom" (10 pages).

"Features Specifications: Non-Metallic Polymer Composite,," http://www.alibaba.com/product-gs/207051916/non_metallic_polymer_composite.html, 2 pages (date Printed Aug. 11, 2008).

File History for U.S. Appl. No. 12/769,209, downloaded Jul. 14, 2015 (549 pages).

File History for U.S. Appl. No. 13/746,045, downloaded Jul. 14, 2015 (266 pages).

File History for U.S. Appl. No. 13/746,045, downloaded Jul. 14, 2015 (380 pages).

"File History," for U.S. Appl. No. 10/988,214, downloaded Aug. 3, 2010 (399 pages).

"File History," for U.S. Appl. No. 12/276,947 downloaded Jan. 21, 2013.

"Final Office Action," for U.S. Appl. No. 10/988,214, mailed Jul. 25, 2012 (18 pages).

"Final Office Action," for U.S. Appl. No. 12/278,638 mailed Dec. 13, 2011 (12 Pages).

"Final Office Action," for U.S. Appl. No. 10/988,214 mailed Mar. 3, 2011 (14 pages).

"Final Office Action," for U.S. Appl. No. 12/276,947, mailed Nov. 2, 2011 (12 pages).

"Final Office Action," for U.S. Appl. No. 12/276,947, mailed Nov. 7, 2013 (14 pages).

"Final Office Action," for U.S. Appl. No. 12/278,633 mailed Jun. 6, 2012 (18 pages).

"First Office Action," for Chinese Application No. 201080018728.7, mailed Mar. 21, 2013 (5 pages).

"First Office Action," for Chinese Application No. 2010800187291, mailed Dec. 6, 2012, Including English translation (8 pages).

"First Office Action," for Japanese Application No. 2010-543277, mailed Nov. 6, 2012, Including English translation (5 pages).

"Formula for Shear," Mar. 5, 2012. 1 pg.

(56) References Cited

OTHER PUBLICATIONS

"Gelest-Silane Coupling Agents: Connectiong Across Boundaries," Gelest Inc. (2006), 60 pgs.
Graham, J F. et al., "Surface Derivatization of Nanoscale Tungsten Probes for Interfacial Force Microscopy," Interface Science Western, Department of Chemistry, University of Western Ontario, London, Ontario Canada. Mar. 23, 1999, 6 pgs.
Hague, A et al., "S2-Glass/Epoxy Polymer Nanocomposites: Manufacturing, Structures, Thermal and Mechanical Properties," Journal of Composite Materials, vol. 37, No. 20, (pp. 1821-1837) (2003) (2 pg. abstract.
Hague, A et al., "S2-Glass/Vinyl ester Polymer Nanocomposites: Manufacturing, Structures, Thermal and Mechanical Properties," 9 pgs. (Publicly Known at least as early as Nov. 24, 2008).
"High Performance Innovations: Case Studies," 20 pages. (Publicly known at least as early as Nov. 24, 2008).
"International Search Report and Written Opinion," for PCT/US06/04817, mailed Jul. 3, 2008.
"International Search Report and Written Opinion," for PCT/US2004/037931 mailed May 25, 2005 (28 pages).
"International Search Report and Written Opinion," for PCT/US2006/004725 mailed Nov. 9, 2006 (14 pages).
"International Search Report and Written Opinion," for PCT/US2010/032950 mailed Sep. 15, 2010 (13 pages).
"International Search Report and Written Opinion," for PCT/US2010/032956 mailed Sep. 15, 2010 (13 pages).
"International Search Report and Written Opinion," for PCT/US2010/032969 mailed Sep. 15, 2010 (14 pages).
"Ken-React Reference Manual: Titanate, Zirconate and Aluminate Coupling Agents," Kenrich Petrochemical, Inc, 1987 (9 pages).
Kroschwitz, "Plastics," Concise Encyclopedia of Polymer Science and Engineering, 1990 (4 pages) 1990.
Lai, et al., "A Study on the Friction and WEar Behavior of PTFE Filled with Acid Treated Nano-Attapulgite," Macromolecular Materials and Engineering, vol. 289, (pp. 916-922) (2004).
Lassner, Erik et al., "Tungsten: Properties, chemistry, Technology of the Element, Alloys, and Chemical Compounds," Vienna University of Technology Vienna, Austria. Kluwer Academic/ Plenum Publishers New York, Boston,Dordrecht, London, Moscow. Springer (1999), 4 pgs.
"Lead Free Weight Suppliers," Materials from web sites of suppliers of auto wheel weights, 2 pages. (Jul. 2005).
"M.C. Gill Corporation—Glossary," Accessed Nov. 22, 2011. 15 pgs.
Manoudis, et al., "Polymer-Silica Nanoparticles Composite Films as Protective Coatings for Stone-Based Monuments," Journal of Physics: Conference Series, vol. 61 (pp. 1361-1365) (2007).
Meyers, M et al., "Biological Materials: Structure and Mechanical Properties," Progress in Materials Science, vol. 53, No. 1, pp. 1-206, http://www.sciencedirect.com/science?_ob=ArticleURL&_udi=B6TX1-4NSOKM2-1&z_u . . . , (Jan. 2008) (3 page abstract).
"Moldman 8000: Presentation," Moldman Machines Low Pressure Injection Molding Technology. moldmanmachines.com/moldman_8000_presentation.php. Jun. 8, 2012. 1 pg.
Monte, Salvatore J. "Ken-React Reference Manual—Titanate, Zirconate and Aluminate Coupling Agents," Kenrich Petrochemicals, Inc. 1985 Second Revised Ed. Summer 1993 (pp. 171-186).
Nickel, Ernest H. "The Definition of a Mineral," The Canadian Mineralogist, vol. 33, (pp. 689-690) (1995).
"Non Final Office Action," for U.S. Appl. No. 10/988,214 mailed Jul. 6, 2014 (11 pages).
"Non-Final Office Action Received," for U.S. Appl. No. 12/769,553 mailed Jan. 27, 2012 (7 pages).
"Non-Final Office Action," for U.S. Appl. No. 12/276,947, mailed May 7, 2013 (15 pages).
"Non-Final Office Action," for U.S. Appl. No. 12/276,947 mailed Mar. 17, 2011 (10 pages).
"Non-Final Office Action," for U.S. Appl. No. 12/278,633 mailed Nov. 25, 2011 (31 pages).
"Non-Final Office Action," for U.S. Appl. No. 12/278,638 mailed Mar. 25, 2011 (27 pages).
"Non-Final Office Action," for U.S. Appl. No. 12/355,203, mailed Apr. 20, 2012 (33 pages).
"Non-Final Office Action," for U.S. Appl. No. 12/769,553 mailed Feb. 14, 2013 (36 pages).
"Nontoxic High Density Compounds," PolyOne. Sep. 12, 2003. 2 pgs.
"Notice of Allowance," for U.S. Appl. No. 12/355,203, mailed Mar. 28, 2013 (33 pages).
"Notice on Reexamination," for Chinese Patent Application No. 2010800187291, mailed Dec. 30, 2014 (21 pages) with English translation.
"Notice on Reexamination," for Chinese Patent Application No. 2010800187291, mailed Jun. 8, 2015 (15 pages) with English translation.
"Office Action," for European Application No. 101826733-2102 mailed Jul. 27, 2011 (39 pages).
"Office Action," for KR Application No. 2008-7022046, mailed Jun. 4, 2012 (16 pages with English translation).
"PCT Notification Concerning Transmittal of International Preliminary Report on Patentability," from International Application No. PCT/US10/32950, corresponding to U.S. Appl. No. 12/769,500, mailed Nov. 10, 2011, pp. 1-7.
"PCT Notification Concerning Transmittal of International Preliminary Report on Patentability," from International Application No. PCT/US10/32956, corresponding to U.S. Appl. No. 12/769,509, mailed Nov. 10, 2011, pp. 1-7.
"PCT Notification Concerning Transmittal of International Preliminary Report on Patentability," from International Application No. PCT/US10/32969, corresponding to U.S. Appl. No. 12/769,553, mailed Nov. 10, 2011, pp. 1-7.
"Photomicrograph of Dispersed Regular Particles in Fractured Composite," 1 page; Aug. 2008.
Plueddemann, Edwin P. "Silane Coupling Agents," Second Edition. Scientist Emeritus Dow Corning Corporation Midland, Michigan. Plenum Press, new York and London. Springer-Verlag New York, LLC, Apr. 1991, 12 pgs.
"Poly[tetrafluoroethylene-co-perfluoro (alkyl vinyl ether)]," Chemcial Book, downloaded May 2014 at http://www.chemicalbook.com/ChemicalProductProperty_EN_CB4319708.htm (2 pages).
"PTFE Characteristics and Applications of Fluon PTFE Aqueous Dispersions," Product Information, retrieved May 2014.
"Putting it Together—The Science and Technology of Composite Materials," Nova Science in the News, http://www.science.org.au/nova/059/059key.htm, 4 pages (Date Printed Aug. 11, 2008).
"Random House Unabridged Dictionary," Second Edition. Random House, Inc. (1993), (pp. 394; 993) 4 pgs.
"Reliability and Key Properties of RT/duroid 6002," Rogers Corporation Advanced Circuit Materials Properties 2.9.4; copyright 1992-2002.
"Renewable Feedstock for Sustainable Materials—Bioproducts—Their Importance to Wales: A Scoping Study," The Centre for Advanced & Renewable Materials, (pp. 1-58) (Nov. 2002).
"Response to Article 94(3) EPC Action," from EP Application No. 10182673.3, filed Jan. 24, 2012, 15 pages.
"Response to Non-Final Office Action," for U.S. Appl. No. 12/769,553 filed Jun. 14, 2013 (37 pages).
"Rheology Glossary," Rheology and viscosity testing, training and consultancy. www.rheologyschool.com/rheology_glossary.html. Feb. 13, 2012, 4 pgs.
Rothon, "Particulate-Filled Polymer Composites, Second Edition," http://www.rapra.net/default.asp?Page=139&Lang=1&ChangeCurrency=$&ItemID=159 . . . , (pp. 1-6) (2003).
"RT/duroid 6002 High Frequency Laminates," Rogers Corporation Data Sheet, copyright 2014.
Sawyer, et al., "Low Friction and Low Wear Polymer/ Polymer Composites," Abstract No. 20070005854, 2 page abstract (Sep. 9, 2004).
Sawyer, W. et al., "Multi-Layer Low Friction and Low Lear Polymer/ Polymer Composites Having Compositionally Graded Interfaces," Abstract No. 20060029795, 1 page abstract (May 31, 2005).
Scheirs, John "Modern Fluoropolymers," (pp. 71-101; 597-614) (1997).

(56) References Cited

OTHER PUBLICATIONS

"Second Office Action," for Chinese Application No. 201080018729.1 mailed May 15, 2013 (18 pages).

Shedd, Kim B. et al., "Tungsten," US Geological Survey Minerals Yearbook. http://minerals.usgs.gov/minerals/pubs/commodity/tungsten/680400.pdf. (1999). 16 pgs.

"Specifications," PolyOne. (Date Unknown). 2 pgs.

"Standard Specification for Biaxially Oriented Polymeric Resin Film for Capacitors in Electrical Equipment," ASTM International (2009), 7 pgs.

"Standard Specificationfor Biaxially Oriented Polymeric Resin Film for Capacitors in Electrical Equipment," ASTM D3664, 2009 (7 pages).

"Steel Wheel Weights," Materials from Web Site of Suppliers of Auto Wheel Weights, 1 pg. (Date Printed Jan. 20, 2006).

Summerscales, "Composite Design and Manufacture (BEng)—Mats 324 Composites Publications," http://www.tech.plym.ac.us/sme/MATS324/Publications.htm (pp. 1-7) (Feb. 17, 2005).

"Tundra and 3M Silanes," http://www.gelest.com/gelestsearch/gelest/gelest_form.asp?formgroup=basenp_form_group and http://www.alfa.com/en/GP100W.pgm?DSSTK=L14043&rnd=573686392, Apr. 14, 2011, 3 pgs.

Wadud, E. S. "Time-Temperature Superposition Using DMA Creep Data," (Date Unknown). 4 pgs.

Wypych, G. "The effect of fillers on the mechanical properties of filled materials," Handbook of Fillers, 2nd Edition, ChemTec Publishing, 1999 (3 pages) 1999.

"Zinc Wheel Weights," Materials from web sites of suppliers of auto wheel weights, 1 page (Date Printed Jan. 20, 2006).

* cited by examiner

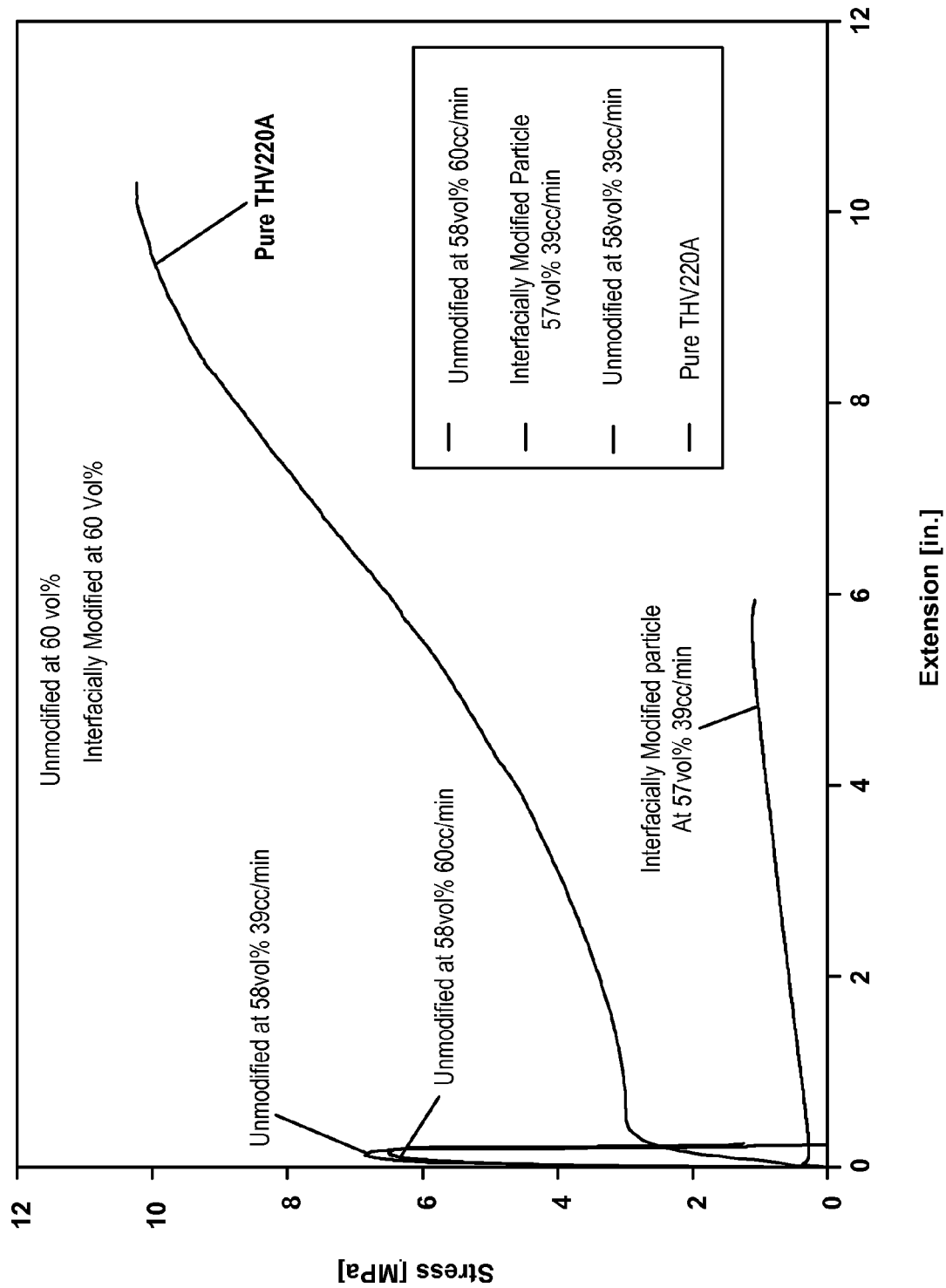

CERAMIC COMPOSITE

CROSS-REFERENCE TO RELATED APPLICATION

This application is a continuation application of U.S. application Ser. No. 12/769,500, filed Apr. 28, 2010, which claims the benefit of U.S. Provisional Patent Application Ser. No. 61/173,791, filed Apr. 29, 2009, both of which applications are hereby incorporated by reference in their entirety.

FIELD OF THE INVENTION

The invention relates to a composite of a ceramic particle and a polymer with modifiable properties to produced enhanced products. The novel properties are produced in the composite by novel interactions of the components. The ceramic particle polymer composite materials are a unique combination of ceramic particle typically particulate components and a polymer material that optimizes the composite structure and characteristics through blending the combined polymer and ceramic particle materials to achieve true composite properties.

BACKGROUND OF THE INVENTION

Substantial attention has been paid to the creation of composite materials with unique properties. Included in this class of materials are materials with improved viscoelastic character, varying densities, varying surface characteristics and other properties which may be used to construct a material with improved properties. As an example, silica sand has been commonly used in applications such as abrasives. Sand paper is an example. However, sandpaper will lose abrasion capacity in a relatively short period of time depending on its application and its use over time, Composite materials have been made for many years by combining generally two dissimilar materials to obtain beneficial properties from both. A true composite is unique because the interaction of the materials provides the best properties and characteristics of both components. Many types of composite materials are known. Generally, the art recognizes that combining metals of certain types and at proportions that form an alloy provides unique properties in metal/metal alloy materials. Metal/ceramic composites have been made typically involving combining metal powder or fiber with clay materials that can be sintered into a metal/ceramic composite.

Combining typically a thermoplastic or thermosetting polymer phase with a reinforcing powder or fiber produces a range of filled materials and, under the correct conditions, can form a true polymer composite. A filled polymer, with the additive as filler, cannot display composite properties. A filler material typically is comprised of inorganic materials that act as either pigments or extenders for the polymer systems. Fillers are often replacements for a more expensive component in the composition. A vast variety of fiber-reinforced composites have been made typically to obtain fiber reinforcement properties to improve the mechanical properties of the polymer in a specific composite.

Many of these materials containing polymer and particulate are admixtures and are not true composites. Admixtures are relatively easily separable into the constituent parts and, once separated, display the individual properties of the components. A true composite resists separation and displays enhanced properties of the input materials whereas the individual input materials often do not display the enhanced properties. A true composite does not display the properties of the individual components but display the unique character of the composite.

While a substantial amount of work has been done regarding composite materials generally, the use of inorganic, non metallic or mineral particles in a polymer composite has not been obtained. Tuning the density the formation of these materials into a composite of a polymer and an inorganic mineral or non-metal provides novel mechanical, and physical properties into the composite and, when used, obtains properties that are not present in other materials. A need exists for material that has tunable density, low toxicity, and improved properties in terms of properties.

BRIEF DESCRIPTION OF THE INVENTION

The invention relates to a composite of a ceramic particle and a polymer having improved and novel properties. The material of the invention is provided through a selection of non metallic, ceramic particle specie, particle size ($P_s$) distribution, polymer type, molecular weight, surface modification and viscoelastic character and processing conditions. The material attains adjustable chemical/physical properties through ceramic particle selection and polymer selection. The resulting composite materials exceed the contemporary composites in terms of density, surface character, reduced toxicity, improved malleability, improved ductility, improved viscoelastic properties (such as tensile modulus, storage modulus, elastic-plastic deformation and others) electrical/magnetic properties, resistance to condition of electricity, vibration or sound, and machine molding properties. We have found that density and polymer viscoelasticity measured as elongation are useful properties and useful predictive parameters of a composite in this technology. In the production of useful enhanced properties, the packing of the selected particle sizes ($P_s$, $P_s^{\;1}$, etc.), distribution population particles, surface modification and the selection of the particulate or mixed ceramic particulate, will obtain the enhanced properties, in part through novel extrusion processing.

BRIEF DESCRIPTION OF THE DRAWINGS

FIG. 1 shows the polymer properties of the composites of the invention.

DETAILED DISCUSSION OF THE INVENTION

The invention relates to novel composites made by combining a ceramic particle particulate with a polymer to achieve novel physical surface and viscoelastic properties. A ceramic material that is or can be formed into a particulate having a particle size ranging from about 10 microns to about 1,000 microns can be used in the invention. The maximum size is such that the particle size ($P_s$) of the particle is less than 20% of either the least dimension or the thinnest part under stress in an end use article. Such particles can be substantially spherical, substantially amorphous or can achieve virtually any three-dimensional shape formable by small particle size materials.

Both thermoplastic and thermosetting resins can be used in the invention. Such resins are discussed in more detail below. In the case of thermoplastic resins, the composites are specifically formed by blending the particulate and interfacial modifier with thermoplastic and then forming the material into a finished composite. Thermosetting composites are made by combining the particulate and interfacial modifier with an uncured material and then curing the material into a finished composite.

In both cases, the particulate material is typically coated with an interfacial modifier, a surface chemical treatment that supports or enhancing the final properties of the composite.

A composite is more than a simple admixture. A composite is defined as a combination of two or more substances intermingled with various percentages of composition, in which each component results in a combination of separate materials, resulting in properties that are in addition to or superior to those of its constituents. In a simple admixture the mixed material have little interaction and little property enhancement. One of the materials is chosen to increase stiffness, strength or density. Atoms and molecules can form bonds with other atoms or molecules using a number of mechanisms. Such bonding can occur between the electron cloud of an atom or molecular surfaces including molecular-molecular interactions, atom-molecular interactions and atom-atom interactions. Each bonding mechanism involves characteristic forces and dimensions between the atomic centers even in molecular interactions. The important aspect of such bonding force is strength, the variation of bonding strength over distance and directionality. The major forces in such bonding include ionic bonding, covalent bonding and the van der Waals' (VDW) types of bonding. Ionic radii and bonding occur in ionic species such as $Na^+Cl^-$, $Li^+F^-$. Such ionic species form ionic bonds between the atomic centers. Such bonding is substantial, often substantially greater than 100 $kJ\text{-}mol^{-1}$ often greater than 250 $kJ\text{-}mol^{-1}$. Further, the interatomic distance for ionic radii tend to be small and on the order of 1-3 Å. Covalent bonding results from the overlap of electron clouds surrounding atoms forming a direct covalent bond between atomic centers. The covalent bond strengths are substantial, are roughly equivalent to ionic bonding and tend to have somewhat smaller interatomic distances.

The varied types of van der Waals' forces are different than covalent and ionic bonding. These van der Waals' forces tend to be forces between molecules, not between atomic centers. The van der Waals' forces are typically divided into three types of forces including dipole-dipole forces, dispersion forces and hydrogen bonding. Dipole-dipole forces are a van der Waals' force arising from temporary or permanent variations in the amount or distribution of charge on a molecule.

TABLE 1

Summary of Chemical Forces and Interactions

| Type of Interaction | Strength | Bond Nature | Strength Proportional to: |
|---|---|---|---|
| Covalent bond | Very strong | Comparatively long range | $r^{-1}$ |
| Ionic bond | Very strong | Comparatively long range | $r^{-1}$ |
| Ion-dipole | Strong | Short range | $r^{-2}$ |
| VDW Dipole-dipole | Moderately strong | Short range | $r^{-3}$ |
| VDW Ion-induced dipole | Weak | Very short range | $r^{-4}$ |
| VDW Dipole-induced dipole | Very weak | Extremely short range | $r^{-6}$ |
| VDW London dispersion forces | Very weak[a] | Extremely short range | $r^{-6}$ |

[a]Since VDW London forces increase with increasing size and there is no limit to the size of molecules, these forces can become rather large. In general, however, they are very weak.

Dipole structures arise by the separation of charges on a molecule creating a generally or partially positive and a generally or partially negative opposite end. The forces arise from electrostatic interaction between the molecule negative and positive regions. Hydrogen bonding is a dipole-dipole interaction between a hydrogen atom and an electronegative region in a molecule, typically comprising an oxygen, fluorine, nitrogen or other relatively electronegative (compared to H) site. These atoms attain a dipole negative charge attracting a dipole-dipole interaction with a hydrogen atom having a positive charge. Dispersion force is the van der Waals' force existing between substantially non-polar uncharged molecules. While this force occurs in non-polar molecules, the force arises from the movement of electrons within the molecule. Because of the rapidity of motion within the electron cloud, the non-polar molecule attains a small but meaningful instantaneous charge as electron movement causes a temporary change in the polarization of the molecule. These minor fluctuations in charge result in the dispersion portion of the van der Waals' force.

Such VDW forces, because of the nature of the dipole or the fluctuating polarization of the molecule, tend to be low in bond strength, typically 50 $kJ\text{ }mol^{-1}$ or less. Further, the range at which the force becomes attractive is also substantially greater than ionic or covalent bonding and tends to be about 3-10 Å.

In the van der Waals composite materials of this invention, we have found that the unique combination of particulate, the varying but controlled particle size of the particle component, the modification of the interaction between the particulate and the polymer, result in the creation of a unique van der Waals' bonding. The van der Waals' forces arise between particulate atoms/crystals in the particulate and are created by the combination of particle size, polymer and interfacial modifiers in the composite.

In the past, materials that are not fully accurately characterized as "composite" have merely comprised a polymer filled with particulate with little or no van der Waals' interaction between the particulate filler material. In the invention, the interaction between the selection of particle size distribution and interfacially modified polymer enables the particulate to achieve an intermolecular distance that creates a substantial van der Waals' bond strength. The prior art materials having little viscoelastic properties, do not achieve a true composite structure. This leads us to conclude that this intermolecular distance is not attained in the prior art. In the discussion above, the term "molecule" can be used to relate to a particle, a particle comprising non-metal crystal or an amorphous aggregate, other molecular or atomic units or sub-units of non metal or inorganic mixtures. coin the composites of the invention, the van der Waals' forces occur between collections of metal atoms that act as "molecules" in the form of mineral, inorganic, or non-metal atom aggregates.

The composite of the invention is characterized by a composite having intermolecular forces between particles about 30 $kJ\text{-}mol^{-1}$ and a bond dimension of 3-10 Å. The particulate in the composite of the invention has a range of particle sizes such that about at least 5 wt.-% of particulate in the range of about 10 to 500 microns and about at least 5 wt.-% of particulate in the range of about 10 to 250 microns, and a polymer, the composite having a van der Waals' dispersion bond strength between molecules in adjacent particles of less than about 4 $kJ\text{-}mol^{-1}$ and a bond dimension of 1.4 to 1.9 Å or less than about 2 $kJ\text{-}mol^{-1}$ and the van der Waals' bond dimension is about 1.5 to 1.8 Å.

In a composite, the reinforcement is usually much stronger and stiffer than the matrix, and gives the composite its good properties. The matrix holds the reinforcements in an orderly high-density pattern. Because the reinforcements are usually discontinuous, the matrix also helps to transfer load among the reinforcements. Processing can aid in the mixing and filling of the reinforcement or particulate. To aid in the mixture, an interfacial modifier can help to overcome the forces that prevent the matrix from forming a substantially continuous phase of the composite. The composite properties arise from the intimate association obtained by use of careful processing and manufacture.

We believe an interfacial modifier is an organic material that provides an exterior coating on the particulate promoting the close association (but with substantially no covalent bonding to particle or polymer) of polymer and particulate. Minimal amounts of the modifier can be used including about 0.005 to 3 wt.-%, or about 0.02 to 2 wt. %. Such a coating can have a thickness of about 0.01 to 1 micron.

For the purpose of this disclosure, the term "particulate" typically refers to a material made into a product having a particle size greater than 10 microns and having a particle size distribution containing at least some particulate in the size range of 10 to 4000 microns. The particles have a range of sizes and circularity parameters. In a packed state, this particulate has an excluded volume of about 13 to 61 vol.-% or about 30 to 75 vol.-%. Alternatively, the particulate can have greater than about 30 vol. %, greater than about 40 vol. % or about 40 to 70 vol.-% particle loading. In this invention, the particulate can comprise two three or more particulates sources, in a blend of materials of differing chemical and physical nature.

For the purpose of this disclosure, the term "non-metallic" relates to a material substantially free of a metal in an oxidation state, approximately 0.

A ceramic particle is typically defined as an inorganic crystalline oxide material. Ceramics are typically solid and inert. Ceramic materials tend to be brittle, hard, strong in compression and weak in shear or tension. Ceramics generally have a very high melting point that is typically greater than 1,000° C., but often ranges from 1,800 to 3,000° C. and in some cases even higher. Traditionally, ceramic materials include materials derived from clay, such as kaolinite. More recent ceramic materials include various silicates, aluminum oxide, silicon carbide and tungsten carbide. Other ceramics include oxides of aluminum and zirconium. Non-oxide ceramics include metal carbides, metal borides, metal nitrides and metal silicides. Other materials can be used in the composites of the invention including minerals, hollow and solid glass spheres and other particulates.

For the purpose of this disclosure, the term "inorganic" relates to a material substantially free of carbon in the form or organic carbon or covalently bonded carbon compounds. Accordingly, compounds such as calcium carbonate or sodium bicarbonate are considered inorganic materials while most organic compounds including small molecules such as methane, ethane, ethylene, propylene, related polymer species, etc., are commonly considered organic materials.

A "mineral" is defined as an element or chemical compound that is normally crystalline and that has been formed as a result of geological processes (Ernest H. Nickel, 1995, *The definition of a mineral*, The Canadian Mineralogist, vol. 33, pp. 689-690). For the purpose of this invention, the term "non-metal, inorganic or mineral" (mineral) is defined, as above, as an element or chemical compound that is normally crystalline and that has been formed as a result of geological processes.

A "glass sphere or bubble" is defined as a glass body having a generally spherical shape having a hollow interior. The glass sphere typically has a particle size ($P_s$) that ranges from about 1 to 150 microns, typically about 10 to 120 microns, preferably about 10 to 100 microns. The internal space within the glass bubble typically ranges from about 6 to 120 microns, often about 8 to 100 microns. Solid glass spheres can also have similar particle sizes.

A "inorganic mineral" as understood in the context of this application includes natural inorganic materials that are not ceramics as defined above. Inorganic compounds are considered to be of a mineral, not biological origin. Inorganic minerals as understood in this application do not include organo, metallic chemistry compounds including metal ions surround by organic ligands. Inorganic compound as minerals typically include inorganic minerals that are found in nature or their synthetic equivalents. Commonly available inorganic minerals include mineral carbonates, mineral aluminates, mineral alumo-silicates, mineral oxides, mineral hydroxides, mineral bicarbonates, mineral sulfates, mineral fluorides, mineral phosphates, mineral alumo-phosphates, mineral alumo-silicates. Garnet is a useful mineral having the formula $X_3Y_2(SiO_4)_3$ wherein X is divalent Ca, Fe or Mg and Y is trivalent Al, Fe or Cr. Examples of inorganic minerals include bauxite (aluminum ore), calcium carbonate, calcium hydroxide, calcium sulfate, cuprous and cupric sulfide, lead oxide, magnesium carbonate, magnesium oxide, magnesium sulfate, magnesium alum compounds, such as potassium alumo-silicate, potassium borate, potassium carbonate, potassium sulfate and other compounds, including sodium silicate, sodium sulfate, etc.

Particle Morphology Index

The interfacial modification technology depends on the ability to isolate the particles from that of the continuous polymer phase. The isolation of the particulates requires placement of a continuous molecular layer(s) of interfacial modifier to be distributed over the surface of the particles. Once this layer is applied, the behavior at the interface of the interfacial modifier to polymer dominates the physical properties of the composite (e.g. tensile and elongation behavior) while the bulk nature of the particle dominates the bulk material characteristics of the composite (e.g. density, thermal conductivity, compressive strength). The correlation of particulate bulk properties to that of the final composite is especially strong due to the high volume percentage loadings of particulate phase associated with the technology.

There are two key attributes of the particle surface that dictate the ability to be successfully interfacially modified: 1) The overall surface area of the particles on a large scale; large being defined as about 100× or more compared to the molecular size of the interfacial modifier. In the case of NZ-12, the molecular diameter is about 2260 ρm and 2) Particle surface characteristics that are on the order of the size of the interfacial modifier being applied.

The following particle morphology attributes specifically contribute to the ability to effectively interfacially modify the particles. Combining the different particle attributes we have derived a particle morphology index. Discussion will reveal that vastly different particle types can be effectively modified from large, smooth, round, and impervious surface types (low particle morphology index) to small, rough, irregular and porous (high particle morphology index):

Particle Size ($P_s$)

A wide range of particle sizes can be effectively interfacially modified. Successful modification has been completed with particles with a major dimension as small as −635 US mesh (<20 μm) to particles as large as −40 US mesh (−425 μm). Undoubtedly, larger particle sizes can be effectively modified (1,500 μm or greater). The absolute size of the particle being modified is not important; the relative size of the major dimension of the largest particle to the minimum critical dimension of the end article is more important. Our composite experience guides us that the major dimension of the largest particles should not be more than $\frac{1}{5}^{th}$ of the minimum critical dimension of the end article.

As the particles become smaller the particulate surface area increases. For smooth spheres of a constant density, there is 28 times more surface area in spheres of 15 μm than 425 μm diameter within a given mass of material. There is 100 times the surface area for particles of 1,500 μm diameter compared to 15 μm.

Dosage levels of interfacial modifier have been effectively adjusted to compensate for changes in surface area due to particle size shifts.

Particle Shape/Aspect Ratio ($P_{sh}$)

The benefits of interfacial modification is independent of overall particle shape. Particles with an aspect ratio of 1 (glass bubbles of iM30K and ceramic G200 microspheres) to 10 (some particularly irregularly shaped garnet) have been favorably interfacially modified. The current upper limit constraint is associated with challenges of successful dispersion of fibers within laboratory compounding equipment without significantly damaging the high aspect ratio fibers. Furthermore, inherent rheological challenges are associated with high aspect ratio fibers. With proper engineering, the ability to successfully compound and produce interfacially modify fibers of fiber fragments with aspect ratio in excess of 10 is envisioned.

At a given minor axis particle dimension, the relationship of particle aspect ratio to surface area is given by:

$$\text{Sphere} = \pi D^2; \text{ and}$$

$$AR\text{object} = \pi D^2(r_a + 0.5);$$

wherein D is diameter, $r_a$ is aspect ratio.

For a given minor dimension, the surface area of a particle with an aspect ratio of 10 has 10.5 times the surface area than a spherical particle. Dosage levels of interfacial modifier can be adjusted to compensate for the variance in surface area due to shape effects.

Particle Roughness ($P_r$)

Macroscopic particle roughness (defined here as 100× the diameter of the interfacial modifier) can be defined by the circularity of the particle. It has been shown that interfacially modified mineral or inorganic particulates with rough and substantially non-spherical shapes obtain the similar advantageous rheology and physical property results as regularly shaped particles. The circularity or roughness of the particle can be measured by microscopic inspection of the particles in which an automated or manual measurement of roughness can be calculated. In such a measurement, the perimeter of a representative selection of the particulate is selected and the area of the particle cross section is also measured. The circularity of the particle is calculated by the following formula:

$$\text{Circularity} = (\text{perimeter})^2/\text{area}.$$

Such materials such as the ceramic microspheres and hollow glass bubbles have a circularity of $4\pi$ (for smooth spherical particles) to 50 (smooth particles with an aspect ratio of 10). Many inorganic and mineral particulate have an oblong, multi lobe, rough non-regular shape or aspect. Such materials have a circularity of 13 to 35 or 13 to 30 and obtain the improved viscoelastic properties of the invention. Using proper optical and image analysis techniques the decoupling of surface roughness and aspect ratio can be determined under the appropriate magnification to quantify large scale particle roughness. The multiplier for the derivation of the particle morphology index must be adjusted for the aspect ratio of the particle.

An alternative to optical procedures consists of using a BET analysis to determine the specific surface area of the particulate phase. The specific surface area captures both the macroscopic particle roughness and particle porosity discussed below for particles of a specific particle size and shape distribution.

Particle Porosity ($P_p$)

The interfacial modifiers are quite large, on the order of a few hundred to a few thousand molecular weight. Within a class of compounds, the effective diameter of the modifier molecule is proportional to the molecular weight. The predicted diameter of the NZ-12 zirconate modifier is 2260 picometer with a molecular weight of 2616 g/mol. The minimum size of the modifier molecules would be about 400 picometer (assuming a molecular weight of 460 g/mol). The size of the titanate modifiers would be slightly smaller than the corresponding zirconate for a corresponding given organophosphate structure.

Literature review of BET surface analysis reveals a large difference in particle surface area of mineral particles (from 0.1 to >100 $m^2\text{-gm}^{-1}$). Nonporous spheres with a diameter of 1,500 micron results in a specific area of 0.017 $m^2\text{-gm}^{-1}$. In all cases, successful interfacial modification of the particulates is possible via changes in modifier loading. It is important to note that required increase in dosage is not directly proportional to the BET surface measurements. The pore size penetrable by the BET probing gas is significantly smaller (20.5 $Å^2$ for krypton for example) than the interfacial modifier. Silica sand had a pore size of 0.90 nm as determined by BET analysis, the interfacial modifier molecule is able to bridge the pore opening. It will be possible to successfully interfacially modify porous absorbents such that the particles composite rheology is improved while absorbent properties of the particulate are maintained due to the relative size differences in the interfacial modifier (large), pore size being bridged (small), and the size of the absorbent molecule (nitrogen, argon, water, etc.) diffusing through the interfacial modifier into the absorbent particulate.

The particle morphology index is defined as:

$$\text{PMI} = (P_s)(P_{sh})(P_r)(P_p)$$

For large, spherical, smooth, non-porous particles the particle morphology index=1 to 200. For small, rough, porous particles with an aspect ratio of 10, the maximum particle morphology index=$100 \times 10.5 \times 100/0.1 = 10^6$. Certain particles with a range of sizes or particle size ($P_s$) and aspect ratios, some roughness and porosity can range from 200 to $10^4$. Other particles with a broadened range of sizes or particle size ($P_s$) and aspect ratios, substantial roughness and increased porosity can range from $2 \times 10^4$ to $10^6$. The amount of interfacial modifier increases with the particle morphology index.

The result of the above particle attributes (particle size and distribution, particle shape, and roughness) results in a specific particle packing behavior. The relationship of these variables leads to a resultant packing fraction. Packing fraction is defined as:

$$P_f = P_d / d_{pync}$$

wherein $P_f$=packing fraction; $P_d$=packing density and $d_{pync}$=pyncnometer density. The relationship of these variables upon particle packing behavior is well characterized and used within powdered metallurgy science. For the case of spherical particles, it is well known that particle packing increases when the size difference between large to small particles increases. With a size ratio of 73 parts by weight large particle:27 parts by weight small, monodispersed spheres with a 7:1 size ratio, the small particles can fit within interstitial spaces of the large particles resulting in a packing level of about 86 volume percent. In practice, it is not possible to attain monodispersed spheres. We have found that increased packing is best when using particles of broad particle size distribution with as large of a size difference between them as possible. In cases like these, we have found packing percentages approaching 80 volume %.

For composites containing high volumetric loading of spherical particles, the rheological behavior of the highly packed composites depends on the characteristics of the contact points between the particles and the distance between particles. When forming composites with polymeric volumes approximately equal to the excluded volume of the particulate phase, inter-particle interaction dominates the behavior of the material. Particles contact one another and the combination of interacting sharp edges, soft surfaces (resulting in gouging) and the friction between the surfaces prevent further or optimal packing. Interfacial modifying chemistries are capable of altering the surface of the particulate by coordination bonding, Van der Waals forces, covalent bonding, or a combination of all three. The surface of the interfacially modified particle behaves as a particle of the interfacial modifier. These organics reduce the friction between particles preventing gouging and allowing for greater freedom of movement between particles. The benefits of utilizing particles in the aforementioned acceptable particle morphology index range does not become evident until packing to a significant proportion of the maximum packing fraction; this value is typically greater than approximately 40 volume % particle phase of the composite.

The spatial character of the particles of the invention can be defined by the circularity of the particle and by its aspect ratio. One surprising aspect of the invention is that even a particle that depart from smooth spherical particle shape and are non-spherical or have substantial aspect ratio are efficiently packed in the composite of the invention. Mineral or inorganic particulates with amorphous, rough and substantially non-spherical shapes obtain the same advantageous rheology as regularly shaped particles. The aspect ratio of the more regular particles of the invention should be less than 1:5 and often less than 1:1.5. Similarly, the particulate with an aspect ratio of less than 10 or about 5:1 also obtain the benefits of the composites of the invention.

We have found that the use of the interfacial modifier disclosed in this application obtains a close association of both spherical and substantially aspherical particles such that effective composites can be made even with particles that depart from the ideal spherical particle (high circularity, i.e. greater than 15). Many inorganic or mineral particles, depending on source and processing can have a narrow particle size distribution, a very regular surface, a low aspect ratio and substantial secularity while other such particles can have a very amorphous non-regular geometry and surface characteristic. We have found that the processes of the invention and the composites made using the interfacial modifier of the invention can obtain useful composites from most particle species disclosed herein.

In the composites of the invention, the van der Waals' forces occur between collections of ceramic particles that act as "molecules" in the form of crystals or other mineral particle aggregates. The composite of the invention is characterized by a composite having intermolecular forces between ceramic particulates that are in the range of van der Waals' strength, i.e., ranges and definitions if appropriate.

In a composite, the ceramic particle is usually much stronger and stiffer than the matrix, and gives the composite its designed properties. The matrix holds the ceramic particle s in an orderly high-density pattern. Because the ceramic particles are usually discontinuous, the matrix also helps to transfer load among the ceramic particles. Processing can aid in the mixing and filling of the ceramic particle. To aid in the mixture, an interfacial modifier, a surface treatment can help to overcome the forces that prevent the matrix from forming a substantially continuous phase of the composite. The tunable composite properties arise from the intimate association obtained by use of careful processing and manufacture. We believe an interfacial modifier is an organic material that provides an exterior coating on the particulate promoting the close association of polymer and particulate. Minimal amounts of the interfacial modifier can be used including about 0.005 to 8 wt.-%, or about 0.02 to 3 wt. %. Higher amounts are used to coat materials with increased morphology.

One important material that can be used as a particulate in the invention includes ceramic materials. Ceramics are typically classified into three distinct material categories, including aluminum oxide and zirconium oxide ceramics, metal carbides, metal borides, metal nitrides, metal silicides, and ceramic material formed from clay or clay-type sources. Examples of useful technical ceramic materials are selected from barium titanate, boron nitride, lead zerconate or lead tantalite, silicate aluminum oxynitrides, silicane carbide, silicane nitride, magnesium silicate, titanium carbide, zinc oxide, zinc dioxide (zerconia) particularly useful ceramics of use in this invention comprise the crystalline ceramics and most preferred in compositions of the invention are the silica aluminum ceramics that can be made into useful particulate. Such ceramics are substantially water insoluble and have a particle size that ranges from about 10 to 500 microns, has a density that ranges from about 1.5 to 3 gram/cc and are commonly commercially available.

Typically, the composite materials of the invention are manufactured using melt processing and are also utilized in product formation using melt processing. A typical thermoplastic polymer material, is combined with particulate and processed until the material attains (e.g.) a uniform density (if density is the characteristic used as a determinant). Alternatively, in the manufacture of the composite material, the ceramic or the thermoplastic polymer may be blended with interfacial modification agents and the modified materials can then be melt processed into the material. Once the material attains a sufficient property, such as, for example, density, the material can be extruded into a product or into a raw material in the form of a pellet, chip, wafer, proform or other easily processed material using conventional processing techniques.

In the manufacture of useful products with the composites of the invention, the manufactured composite can be obtained in appropriate amounts, subjected to heat and pressure, typically in extruder equipment and then formed into an appropriate shape having the correct amount of materials in the appropriate physical configuration. In the appropriate product design, during composite manufacture or during product manufacture, a pigment or other dye material can be added to the processing equipment. One advantage of this material is that an inorganic dye or pigment can be co-processed resulting in a material that needs no exterior painting or coating to obtain an attractive, functional, or decorative appearance. The pigments can be included in the polymer blend, can be uniformly distributed throughout the material and can result in a surface that cannot chip, scar or lose its decorative appearance. One particularly important pigment material comprises titanium dioxide ($TiO_2$). This material is extremely nontoxic, is a bright white particulate that can be easily combined with either ceramic particulates and/or polymer composites to enhance the novel characteristics of the composite material and to provide a white hue to the ultimate composite material.

We have further found that a blend of a ceramic and one, two, three or more hollow glass microspheres, non-metal, inorganic or minerals in particulate form can, obtain important composite properties from all of particulate materials in a polymer composite structure. Such composites each can have unique or special properties. These composite processes and materials have the unique capacity and property that the composite acts as a blended composite of two or three different materials that could not, due to melting point and other processing difficulties, be made into a blend without the methods of the invention.

A large variety of polymer materials can be used in the composite materials of the invention. For the purpose of this application, a polymer is a general term covering either a thermoset or a thermoplastic. We have found that polymer materials useful in the invention include both condensation polymeric materials and addition or vinyl polymeric materials. Included are both vinyl and condensation polymers, and polymeric alloys thereof. Vinyl polymers are typically manufactured by the polymerization of monomers having an ethylenically unsaturated olefinic group. Condensation polymers are typically prepared by a condensation polymerization reaction which is typically considered to be a stepwise chemical reaction in which two or more molecules combined, often but not necessarily accompanied by the separation of water or some other simple, typically volatile substance. Such polymers can be formed in a process called polycondensation. The polymer has a density of at least 0.85 gm-cm$^{-3}$, however, polymers having a density of greater than 0.96 are useful to enhance overall product density. A density is often up to 1.7 or up to 2 gm-cm$^{-3}$ or can be about 1.5 to 1.95 gm-cm$^{-3}$.

Vinyl polymers include polyethylene, polypropylene, polybutylene, acrylonitrile-butadiene-styrene (ABS), poly-butylene copolymers, polyacetyl resins, polyacrylic resins, homopolymers or copolymers comprising vinyl chloride, vinylidene chloride, fluorocarbon copolymers, etc. Condensation polymers include nylon, phenoxy resins, polyarylether such as polyphenylether, polyphenylsulfide materials; polycarbonate materials, chlorinated polyether resins, polyethersulfone resins, polyphenylene oxide resins, polysulfone resins, polyimide resins, thermoplastic urethane elastomers and many other resin materials.

Condensation polymers that can be used in the composite materials of the invention include polyamides, polyamide-imide polymers, polyarylsulfones, polycarbonate, polybutylene terephthalate, polybutylene naphthalate, polyetherimides, polyethersulfones, polyethylene terephthalate, thermoplastic polyamides, polyphenylene ether blends, polyphenylene sulfide, polysulfones, thermoplastic polyurethanes and others. Preferred condensation engineering polymers include polycarbonate materials, polyphenyleneoxide materials, and polyester materials including polyethylene terephthalate, polybutylene terephthalate, polyethylene naphthalate and polybutylene naphthalate materials.

Polycarbonate engineering polymers are high performance, amorphous engineering thermoplastics having high impact strength, clarity, heat resistance and dimensional stability. Polycarbonates are generally classified as a polyester or carbonic acid with organic hydroxy compounds. The most common polycarbonates are based on phenol A as a hydroxyl compound copolymerized with carbonic acid. Materials are often made by the reaction of a biphenyl A with phosgene (O=CCl$_2$). Polycarbonates can be made with phthalate monomers introduced into the polymerization extruder to improve properties such as heat resistance, further trifunctional materials can also be used to increase melt strength or extrusion blow molded materials. Polycarbonates can often be used as a versatile blending material as a component with other commercial polymers in the manufacture of alloys. Polycarbonates can be combined with polyethylene terephthalate acrylonitrile-butadiene-styrene, styrene maleic anhydride and others. Preferred alloys comprise a styrene copolymer and a polycarbonate. Preferred polycarbonate materials should have a melt index between 0.5 and 7, preferably between 1 and 5 gms/10 min.

A variety of polyester condensation polymer materials including polyethylene terephthalate, polybutylene terephthalate, polyethylene naphthalate, polybutylene naphthalate, etc. can be useful in the composites of the invention. Polyethylene terephthalate and polybutylene terephthalate are high performance condensation polymer materials. Such polymers often made by a copolymerization between a diol (ethylene glycol, 1,4-butane diol) with dimethyl terephthalate. In the polymerization of the material, the polymerization mixture is heated to high temperature resulting in the transesterification reaction releasing methanol and resulting in the formation of the engineering plastic. Similarly, polyethylene naphthalate and polybutylene naphthalate materials can be made by copolymerizing as above using as an acid source, a naphthalene dicarboxylic acid. The naphthalate thermoplastics have a higher Tg and higher stability at high temperature compared to the terephthalate materials. However, all these polyester materials are useful in the composite materials of the invention. Such materials have a preferred molecular weight characterized by melt flow properties. Useful polyester materials have a viscosity at 265° C. of about 500-2000 cP, preferably about 800-1300 cP.

Polyphenylene oxide materials are engineering thermoplastics that are useful at temperature ranges as high as 330° C. Polyphenylene oxide has excellent mechanical properties, dimensional stability, and dielectric characteristics. Commonly, phenylene oxides are manufactured and sold as polymer alloys or blends when combined with other polymers or fiber. Polyphenylene oxide typically comprises a homopolymer of 2,6-dimethyl-1-phenol. The polymer commonly known as poly(oxy-(2,6-dimethyl-1,4-phenylene)). Polyphenylene is often used as an alloy or blend with a polyamide, typically nylon 6-6, alloys with polystyrene or high impact styrene and others. A preferred melt index (ASTM 1238) for the polyphenylene oxide material useful in the invention typically ranges from about 1 to 20, preferably about 5 to 10 gm/10 min. The melt viscosity is about 1000 cP at 265° C.

Another class of thermoplastic include styrenic copolymers. The term styrenic copolymer indicates that styrene is copolymerized with a second vinyl monomer resulting in a vinyl polymer. Such materials contain at least a 5 mol-% styrene and the balance being 1 or more other vinyl monomers. An important class of these materials are styrene acrylonitrile (SAN) polymers. SAN polymers are random amorphous linear copolymers produced by copolymerizing styrene acrylonitrile and optionally other monomers. Emulsion, suspension and continuous mass polymerization techniques have been used. SAN copolymers possess transparency, excellent thermal properties, good chemical resistance and hardness. These polymers are also characterized by their rigidity, dimensional stability and load bearing capability. Olefin modified SAN's (OSA polymer materials) and acrylic styrene acrylonitriles (ASA polymer materials) are known. These materials are somewhat softer than unmodified SAN's and are ductile, opaque, two phased terpolymers that have surprisingly improved weatherability.

ASA polymers are random amorphous terpolymers produced either by mass copolymerization or by graft copolymerization. In mass copolymerization, an acrylic monomer styrene and acrylonitrile are combined to form a heteric terpolymer. In an alternative preparation technique, styrene acrylonitrile oligomers and monomers can be grafted to an acrylic elastomer backbone. Such materials are characterized as outdoor weatherable and UV resistant products that provide excellent accommodation of color stability property retention and property stability with exterior exposure. These materials can also be blended or alloyed with a variety of other polymers including polyvinyl chloride, polycarbonate, polymethyl methacrylate and others. An important class of styrene copolymers includes the acrylonitrile-butadiene-styrene monomers. These polymers are very versatile family of engineering thermoplastics produced by copolymerizing the three monomers. Each monomer provides an important property to the final terpolymer material. The final material has excellent heat resistance, chemical resistance and surface hardness combined with processability, rigidity and strength. The polymers are also tough and impact resistant. The styrene copolymer family of polymers have a melt index that ranges from about 0.5 to 25, preferably about 0.5 to 20.

An important class of engineering polymers that can be used in the composites of the invention include acrylic polymers. Acrylics comprise a broad array of polymers and copolymers in which the major monomeric constituents are an ester acrylate or methacrylate. These polymers are often provided in the form of hard, clear sheet or pellets. Acrylic monomers polymerized by free radical processes initiated by typically peroxides, azo compounds or radiant energy. Commercial polymer formulations are often provided in which a variety of additives are modifiers used during the polymerization provide a specific set of properties for certain applications. Pellets made for polymer grade applications are typically made either in bulk (continuous solution polymerization), followed by extrusion and pelleting or continuously by polymerization in an extruder in which unconverted monomer is removed under reduced pressure and recovered for recycling. Acrylic plastics are commonly made by using methyl acrylate, methylmethacrylate, higher alkyl acrylates and other copolymerizable vinyl monomers. Preferred acrylic polymer materials useful in the composites of the invention has a melt index of about 0.5 to 50, preferably about 1 to 30 gm/10 min.

Vinyl polymer polymers include a acrylonitrile; polymer of alpha-olefins such as ethylene, propylene, etc.; chlorinated monomers such as vinyl chloride, vinylidene dichloride, acrylate monomers such as acrylic acid, methylacrylate, methylmethacrylate, acrylamide, hydroxyethyl acrylate, and others; styrenic monomers such as styrene, alphamethyl styrene, vinyl toluene, etc.; vinyl acetate; and other commonly available ethylenically unsaturated monomer compositions.

Polymer blends or polymer alloys can be useful in manufacturing the pellet or linear extrudate of the invention. Such alloys typically comprise two miscible polymers blended to form a uniform composition. Scientific and commercial progress in the area of polymer blends has lead to the realization that important physical property improvements can be made not by developing new polymer material but by forming miscible polymer blends or alloys. A polymer alloy at equilibrium comprises a mixture of two amorphous polymers existing as a single phase of intimately mixed segments of the two macro molecular components. Miscible amorphous polymers form glasses upon sufficient cooling and a homogeneous or miscible polymer blend exhibits a single, composition dependent glass transition temperature (Tg). Immiscible or non-alloyed blend of polymers typically displays two or more glass transition temperatures associated with immiscible polymer phases. In the simplest cases, the properties of polymer alloys reflect a composition weighted average of properties possessed by the components. In general, however, the property dependence on composition varies in a complex way with a particular property, the nature of the components (glassy, rubbery or semi-crystalline), the thermodynamic state of the blend, and its mechanical state whether molecules and phases are oriented.

The primary requirement for the substantially thermoplastic engineering polymer material is that it retains sufficient thermoplastic properties such as viscosity and stability, to permit melt blending with a particulate, permit formation of linear extrudate pellets, and to permit the composition material or pellet to be extruded or injection molded in a thermoplastic process forming the useful product. Engineering polymer and polymer alloys are available from a number of manufacturers including Dyneon LLC, B.F. Goodrich, G.E., Dow, and duPont.

Polyester polymers are manufactured by the reaction of a dibasic acid with a glycol. Dibasic acids used in polyester production include phthalic anhydride, isophthalic acid, maleic acid and adipic acid. The phthalic acid provides stiffness, hardness and temperature resistance; maleic acid provides vinyl saturation to accommodate free radical cure; and adipic acid provides flexibility and ductility to the cured polymer. Commonly used glycols are propylene glycol which reduces crystalline tendencies and improves solubility in styrene. Ethylene glycol and diethylene glycol reduce crystallization tendencies. The diacids and glycols are condensed eliminating water and are then dissolved in a vinyl monomer to a suitable viscosity. Vinyl monomers include styrene, vinyltoluene, paramethylstyrene, methylmethacrylate, and diallyl phthalate. The addition of a polymerization initiator, such as hydroquinone, tertiary butylcatechol or phenothiazine extends the shelf life of the uncured polyester polymer. Polymers based on phthalic anhydride are termed orthophthalic polyesters and polymers based on isophthalic acid are termed isophthalic polyesters. The viscosity of the unsaturated polyester polymer can be tailored to an application. Low viscosity is important in the fabrication of fiber-reinforced composites to ensure good wetting and subsequent high adhesion of the reinforcing layer to the underlying substrate. Poor wetting can result in large losses of mechanical properties. Typically, polyesters are manufactured with a styrene concentration or other monomer concentration producing polymer having an uncured viscosity of 200-1,000 mPa·s(cP). Specialty polymers may have a viscosity that ranges from about 20 cP to 2,000 cP. Unsaturated polyester polymers are typically cured by free radical initiators commonly produced using peroxide materials. Wide varieties of peroxide initiators are available and are commonly used. The peroxide initiators thermally decompose forming free radical initiating species.

Phenolic polymers can also be used in the manufacture of the structural members of the invention. Phenolic polymers typically comprise a phenol-formaldehyde polymer. Such polymers are inherently fire resistant, heat resistant and are low in cost. Phenolic polymers are typically formulated by blending phenol and less than a stoichiometric amount of formaldehyde. These materials are condensed with an acid catalyst resulting in a thermoplastic intermediate polymer called NOVOLAK. These polymers are oligomeric species terminated by phenolic groups. In the presence of a curing agent and optional heat, the oligomeric species cure to form a very high molecular weight thermoset polymer. Curing agents for novalaks are typically aldehyde compounds or methylene (—CH$_2$—) donors. Aldehydic curing agents include paraformaldehyde, hexamethylenetetramine, formaldehyde, propionaldehyde, glyoxal and hexamethylmethoxy melamine.

The fluorocarbon polymers useful in this invention are perflourinated and partially fluorinated polymers made with monomers containing one or more atoms of fluorine, or copolymers of two or more of such monomers. Common examples of fluorinated monomers useful in these polymers or copolymers include tetrafluoroethylene (TFE), hexafluoropropylene (HFP), vinylidene fluoride (VDF), perfluoroalkylvinyl ethers such as perfluoro-(n-propyl-vinyl) ether (PPVE) or perfluoromethylvinylether (PMVE). Other copolymerizable olefinic monomers, including non-fluorinated monomers, may also be present.

Particularly useful materials for the fluorocarbon polymers are TFE-HFP-VDF terpolymers (melting temperature of about 100 to 260° C.; melt flow index at 265° C. under a 5 kg load is about 1-30 g-10 min$^{-1}$), hexafluoropropylene-tetrafluoroethylene-ethylene (HTE) terpolymers (melting temperature about 150 to 280° C.; melt flow index at 297° C. under a 5 kg load of about 1-30 g-10 min$^{-1}$), ethylene-tetrafluoroethylene (ETFE) copolymers (melting temperature about 250 to 275° C.; melt flow index at 297° C. under a 5 kg load of about 1-30 g-10 min$^{-1}$), hexafluoropropylene-tetrafluoroethylene (FEP) copolymers (melting temperature about 250 to 275° C.; melt flow index at 372° C. under a 5 kg load of about 1-30 g-10 min$^{-1}$), and tetrafluoroethylene-perfluoro(alkoxy alkane) (PFA) copolymers (melting temperature about 300 to 320° C.; melt flow index at 372° C. under a 5 kg load of about 1-30 g-10 min$^{-1}$). Each of these fluoropolymers is commercially available from Dyneon LLC, Oakdale, Minn. The TFE-HFP-VDF terpolymers are sold under the designation "THV".

Also useful are vinylidene fluoride polymers primarily made up of monomers of vinylidene fluoride, including both homo polymers and copolymers. Such copolymers include those containing at least 50 mole percent of vinylidene fluoride copolymerized with at least one comonomer selected from the group consisting of tetrafluoroethylene, trifluoroethylene, chlorotrifluoroethylene, hexafluoropropene, vinyl fluoride, pentafluoropropene, and any other monomer that readily copolymerizes with vinylidene fluoride. These materials are further described in U.S. Pat. No. 4,569,978 (Barber) incorporated herein by reference. Preferred copolymers are those composed of from at least about 70 and up to 99 mole percent vinylidene fluoride, and correspondingly from about 1 to 30 percent tetrafluoroethylene, such as disclosed in British Patent No. 827,308; and about 70 to 99 percent vinylidene fluoride and 1 to 30 percent hexafluoropropene (see for example U.S. Pat. No. 3,178,399); and about 70 to 99 mole percent vinylidene fluoride and 1 to 30 percent trifluoroethylene Terpolymers of vinylidene fluoride, trifluoroethylene and tetrafluoroethylene such as described in U.S. Pat. No. 2,968,649 and terpolymers of vinylidene fluoride, trifluoroethylene and tetrafluoroethylene are also representative of the class of vinylidene fluoride copolymers which are useful in this invention. Such materials are commercially available under the KYNAR trademark from Arkema Group located in King of Prussia, Pa. or under the DYNEON trademark from Dyneon LLC of Oakdale, Minn.

Fluorocarbon elastomer materials can also be used in the composite materials of the invention. Fluorocarbon elastomers contain VF$_2$ and HFP monomers and optionally TFE and have a density greater than 1.8 gm-cm$^{-3}$; these polymers exhibit good resistance to most oils, chemicals, solvents, and halogenated hydrocarbons, and excellent resistance to ozone, oxygen, and weathering. Their useful application temperature range is −40° C. to 300° C. Fluorocarbon elastomer examples include those described in detail in Lentz, U.S. Pat. No. 4,257,699, as well as those described in Eddy et al., U.S. Pat. No. 5,017,432 and Ferguson et al., U.S. Pat. No. 5,061,965. The disclosures of each of these patents are totally incorporated herein by reference.

Latex fluorocarbon polymers are available in the form of the polymers comprising the PFA, FEP, ETFE, HTE, THV and PVDF monomers. Fluorinated poly(meth)acrylates can generally be prepared by free radical polymerization either neat or in solvent, using radical initiators well known to those skilled in the art. Other monomers which can be copolymerized with these fluorinated (meth)acrylate monomers include alkyl(meth)acrylates, substituted alkyl(meth)acrylates, (meth)acrylic acid, (meth)acrylamides, styrenes, vinyl halides, and vinyl esters. The fluorocarbon polymers can comprise polar constituents. Such polar groups or polar group containing monomers may be anionic, nonionic, cationic, or amphoteric. In general, the more commonly employed polar groups or polar group-containing organic radicals include organic acids, particularly carboxylic acid, sulfonic acid and phosphonic acid; carboxylate salts, sulfonates, phosphonates, phosphate esters, ammonium salts, amines, amides, alkyl amides, alkyl aryl amides, imides, sulfonamides, hydroxymethyl, thiols, esters, silanes, and polyoxyalkylenes, as well as other organic radicals such as alkylene or arylene substituted with one or more of such polar groups. The latex fluorocarbon polymers described herein are typically aqueous dispersed solids but solvent materials can be used. The fluorocarbon polymer can combined with various solvents to form emulsion, solution or dispersion in a liquid form. Dispersions of fluoropolymers can be prepared using conventional emulsion polymerization techniques, such as described in U.S. Pat. Nos. 4,418,186; 5,214,106; 5,639,838; 5,696,216 or *Modern Fluoropolymers*, Edited by John Scheirs, 1997 (particularly pp. 71-101 and 597-614) as well as assignees' copending patent application Ser. No. 01/03,195, filed Jan. 31, 2001.

The liquid forms can be further diluted in order to deliver the desired concentration. Although aqueous emulsions, solutions, and dispersions are preferred, up to about 50% of a cosolvent such as methanol, isopropanol, or methyl perfluorobutyl ether may be added. Preferably, the aqueous emulsions, solutions, and dispersions comprise less than about 30% cosolvent, more preferably less than about 10% cosolvent, and most preferably the aqueous emulsions, solutions, and dispersions are substantially free of cosolvent.

Interfacial modifiers provide the close association of the particle with the polymer. Interfacial modifiers used in the non-reactive or non-crosslinking application fall into broad categories including, for example, stearic acid derivatives, titanate compounds, zirconate compounds, phosphonate compounds, aluminate compounds. Aluminates, phosphonates, titanates and zirconates useful contain from about 1 to about 3 ligands comprising hydrocarbyl phosphate esters and/or hydrocarbyl sulfonate esters and about 1 to 3 hydrocarbyl ligands which may further contain unsaturation and heteroatoms such as oxygen, nitrogen and sulfur. Preferably the titanates and zirconates contain from about 2 to about 3 ligands comprising hydrocarbyl phosphate esters and/or hydrocarbyl sulfonate esters, preferably 3 of such ligands and about 1 to 2 hydrocarbyl ligands, preferably 1 hydrocarbyl ligand.

The choice of interfacial modifiers is dictated by particulate, polymer, and application. The particle surface is substantially continuously coated even if having substantial morphology. The coating isolates the particulate from the polymer. The maximum density of a composite is a function of the densities of the materials and the volume fractions of each. Higher density composites are achieved by maximizing the per unit volume of the materials with the highest densities. These materials are extremely hard and difficult to deform, usually resulting in brittle fracture. When compounded with deformable polymeric binders, these brittle materials may be formed into usable shapes using traditional thermoplastic equipment. However, the maximum densities achievable will be less then optimum. When forming composites with polymeric volumes approximately equal to the excluded volume of the filler, inter-particle interaction dominates the behavior of the material. Particles contact one another and the combination of interacting sharp edges, soft surfaces (resulting in gouging, points are usually work hardened) and the friction between the surfaces prevent further or optimal packing. Therefore, maximizing properties is a function of softness of surface, hardness of edges, point size of point (sharpness), surface friction force and pressure on the material, circularity, and the usual, shape size distribution. Because of this inter-particle friction, the forming pressure will decrease exponentially with distance from the applied force. Interfacially modifying chemistries are capable of modifying the surface of the dense filler by coordination bonding, Van der Waals forces, covalent bonding, or a combination of all three. The surface of the particle behaves as a particle of the non-reacted end of the interfacial modifier. These organics reduce the friction between particles preventing gouging and allowing for greater freedom of movement between particles. These phenomenon allow the applied shaping force to reach deeper into the form resulting in a more uniform pressure gradient.

Preferred titanates and zirconates include isopropyl tri(dioctyl)pyrophosphato titanate (available from Kenrich Chemicals under the designation KR38S), organo titanates KR-238J and KR9S, neopentyl(diallyl)oxy, tri(dodecyl)benzene-sulfonyl titanate (available from Kenrich Chemicals under the trademark and designation LICA 09), neopentyl(diallyl)oxy, trioctylphosphato titanate (available from Kenrich Chemicals under the trademark and designation LICA 12), neopentyl (diallyl)oxy, tri(dodecyl)benzene-sulfonyl zirconate (available from Kenrich Chemicals under the designation NZ 09), neopentyl(diallyl)oxy, tri(dioctyl)phosphato zirconate (available from Kenrich Chemicals under the designation NZ 12), and neopentyl(diallyl)oxy, tri(dioctyl)pyro-phosphato zirconate (available from Kenrich Chemicals under the designation NZ 38). The interfacial modifiers modify the particulate in the composites of the invention with the formation of a layer on the surface of the particle reducing the intermolecular forces, improving the tendency of the polymer mix with the particle, and resulting in increased composite density. Density is maximized as the number of claose association between the particulate surface and polymer is maximized.

Thermosetting polymers can be used in an uncured form to make the composites with the interfacial modifiers. Once the composite is formed the reactive materials can chemically bond the polymer phase if a thermoset polymer is selected. The reactive groups in the thermoset can include methacrylyl, styryl, or other unsaturated or organic materials.

Thermoplastics include polyvinylchloride, polyphenylene sulfite, acrylic homopolymers, maleic anhydride containing polymers, acrylic materials, vinyl acetate polymers, diene containing copolymers such as 1,3-butadiene, 1,4-pentadiene, halogen or chlorosulfonyl modified polymers or other polymers that can react with the composite systems of the invention. Condensation polymeric thermoplastics can be used including polyamides, polyesters, polycarbonates, polysulfones and similar polymer materials by reacting end groups with silanes having aminoalkyl, chloroalkyl, isocyanato or similar functional groups.

The manufacture of the particulate composite materials depends on good manufacturing technique. Often the particulate is initially treated with an interfacial modifier by spraying the particulate with a 25 wt-% solution of interfacial modifier on the particle with blending and drying carefully to ensure uniform particulate coating. interfacial modifier can also be added to particles in bulk blending operations using high intensity Littleford or Henschel blenders. Alternatively, twin cone mixers can be followed by drying or direct addition to a screw compounding device. Interfacial modifiers may also be reacted with the particulate in aprotic solvent such as toluene, tetrahydrofuran, mineral spirits or other such known solvents.

The particulate can be interfacially combined into the polymer phase depending on the nature of the polymer phase, the filler, the particulate surface chemistry and any pigment process aid or additive present in the composite material. In general, the mechanism used to couple particulate to polymer include solvation, chelation, coordination bonding (ligand formation), etc. Typically, however, covalent bonds, linking the particle or interfacial modifier, and the polymer is not formed. Titanate, phosphonate or zirconate agents can be used. Such agents have the following formula:

$$(RO)_m—Ti—(O—X—R'—Y)_n$$

$$(RO)_m—Zr—(O—X—R'—Y)_n$$

$$(RO)_m—P—(O—X—R'—Y)_n$$

wherein R and R' are independently a hydrocarbyl, C1-C12 alkyl group or a C7-20 alkyl or alkaryl group wherein the alkyl or alkaryl groups may optionally contain one or more oxygen atoms or unsaturation; X is sulfate or phosphate; Y is H or any common substituent for alkyl or aryl groups; m and n are 1 to 3. Titanates provide antioxidant properties and can modify or control cure chemistry. Zirconate provides excellent bond strength but maximizes curing, reduces formation of off color in formulated thermoplastic materials. A useful zirconate material is neopentyl(diallyl)oxy-tri(dioctyl)phosphato-zirconate.

The composite materials having the desired physical properties can be manufactured as follows. In a preferred mode, the surface coating of the particulate with the surface modifier is initially prepared. The interfacial modifier is coated on the prepared particle material, and the resulting product is isolated and then combined with the continuous polymer phase to affect an interfacial association between the particulate and the polymer. In the composite, the coating of the surface modifier is less than 1 microns thick and isolates the particle from the polymer. The polymer 'sees" only the coating material. Once the composite material is prepared, it is then formed into the desired shape of the end use material. Solution processing is an alternative that provides solvent recovery during materials processing. The materials can also be dry-blended without solvent. Blending systems such as ribbon blenders obtained from Drais Systems, high density drive blenders available from Littleford Brothers and Henschel are possible. Further melt blending using Banberry, veferralle single screw or twin screw compounders is also useful. When the materials are processed as a plastisol or organosol with solvent, liquid ingredients are generally charged to a processing unit first, followed by polymer polymer, particulate and rapid agitation. Once all materials are added a vacuum can be applied to remove residual air and solvent, and mixing is continued until the product is uniform and high in density.

Dry blending is generally preferred due to advantages in cost. However certain embodiments can be compositionally unstable due to differences in particle size. In dry blending processes, the composite can be made by first introducing the polymer, combining the polymer stabilizers, if necessary, at a temperature from about ambient to about 60° C. with the polymer, blending a particulate (modified if necessary) with the stabilized polymer, blending other process aids, interfacial modifier, colorants, indicators or lubricants followed by mixing in hot mix, transfer to storage, packaging or end use manufacture.

Interfacially modified materials can be made with solvent techniques that use an effective amount of solvent to initiate formation of a composite. When interfacial treatment is substantially complete, the solvent can be stripped. Such solvent processes are conducted as follows:
1) Solvating the interfacial modifier or polymer or both;
2) Mixing the particulate into a bulk phase or polymer master batch: and
3) Devolatilizing the composition in the presence of heat and vacuum above the Tg of the polymer When compounding with twin screw compounders or extruders, a preferred process can be used involving twin screw compounding as follows.
1. Add particulate and raise temperature to remove surface water (barrel 1).
2. Add interfacial modifier to twin screw when filler is at temperature (barrel 3).
3. Disperse/distribute surface chemical treatment on particulate.
4. Maintain temperature to completion.
5. Vent by-products (barrel 6).
6. Add polymer binder (barrel 7).
7. Compress/melt polymer binder.
8. Disperse/distribute polymer binder in particulate.
9. Combine modified particulate with polymer binder.
10. Vacuum degas remaining products (barrel 9).
11. Compress resulting composite.
12. Form desired shape, pellet, lineal, tube, injection mold article, etc. through a die or post-manufacturing step.

Alternatively in formulations containing small volumes of continuous phase:
1. Add polymer binder.
2. Add interfacial modifier to twin screw when polymer binder is at temperature.
3. Disperse/distribute interfacial modifier in polymer binder.
4. Add filler and disperse/distribute particulate.
5 Raise temperature to coating temperature.
6. Maintain temperature to completion.
7. Compress resulting composite.
8. Form desired shape, pellet, lineal, tube, injection mold article, etc. through a die or post-manufacturing step.

Certain selections of polymers and particulates may permit the omission of the interfacial modifier and their related processing steps.

Experimental Section

THV220A (Dyneon Polymers, Oakdale Minn.) is a polymer of tetrafluoroethylene, hexafluoropropylene, and vinylidene fluoride. The material is intended for extrusion applications, has a melting point of 120° C. and a specific gravity of 1.9 g/cc.

NZ 12 is neopentyl(diallyl)oxy-tri(dioctyl)phosphato-zirconate. It is available from KenRich Petrochemicals (Bayonne, N.J.). NZ12 has a specific gravity of 1.06 g/cc and is readily soluble in isopropyl alcohol (IPA).

Methods and Procedures

Powder Characterizations:

Powder characterization is completed to determine packing behavior of the powdered materials. Packing fraction is determined by dividing the packing density of the powder by the true density as determined via helium pycnometry. Packing fraction is defined as:

$$P_f = P_d / d_{pync}$$

wherein $P_f$=packing fraction; $P_d$=packing density and $d_{pync}$=pyncnometer density.

Packing density is determined by measuring the bulk powder weight within a volume. The packing density is commonly determined by placing the powder within a metallurgical press. The press setup is available from Buehler International (Lake Bluff, Ill.). For frangible materials, pressure is reduced to the appropriate level to reduce breakage of the powder particles thereby preventing artificially high packing density values. For very frangible materials, a tap density is used. The pycnometer density is determined by helium gas pycnometry (AccuPync 1330 manufactured by Micromeretics Corporation—Norcross, Ga.).

Application of Interfacial Modifier:

To interfacially modify particles at a lab scale, the interfacial modifier is first solubilized with isopropyl alcohol (IPA). The IPA/modifier mixture is applied to the powdered material previously placed within a rotating stainless steel rotating cooking stock pot. The 3 gallon stainless steel cooking pot was coupled to a DC drive and motor for controlled rotation with the pot orientated at 30 degrees from horizontal. The IPA/modifier mixture is added along with additional IPA in enough volume to fully wet and flood the particles. The outer part of the pot is then heated externally with an industrial heat gun to volatize the IPA. After a sufficient time, the modified particles become free flowing—an indication that they are ready for compounding within our laboratory twin screw compounding equipment.

Compounding:

The polymer and modified particles are fed in appropriate ratios using K-tron K20 gravimetric weight loss feeders. The raw ingredients are fused together within a 19 mm B&P twin screw compounder. Barrel zone temperatures (5), screw speed, volumetric throughput, and die characteristics (number of openings and opening diameter) are varied depending on the nature of the particles and polymers being compounded. Commonly, torque, pressure, and melt temperature are monitored responses. A useful way to ensure the proper ratio of polymer and particulate(s) is to place compounded pellets into the heated metallurgical press; we call this the "puck density".

Extrusion:

The compounded products are extruded using 1" diameter extruder (Al—Be Industries, Fullerton, Calif.). Temperatures and volumetric throughput vary depending on the rheological behavior of the materials being extruded. Typically, motor amp load and extrusion pressures are monitored responses and used to gauge ease of extudability. For samples requiring characterization of tensile properties, the materials are extruded through a 19 mm×3 mm rectangular die plate onto a moving belt to minimize extrudate draw-down.

Tensile and Elongation:

ASTM Type IV dogbones were die cut from the extruded strips. The dog-bones were then tensile tested using a Lloyd Instruments universal testing machine produced by Ametek, Inc. A one-inch gauge length was used in the strain calculations. The cross-head speed was varied in an attempt to meet ASTM standards of tensile test duration lasting between 30 seconds and 3 minutes. A stress/strain curve was generated for the test samples.

EXAMPLE 1

Aluminum Oxide

Aluminum oxide ($Al_2O_3$) was obtained from Sterling Supply, Inc (Minneapolis, Minn.), part number AO120. The particles were −120 mesh size (<125 micron). Composites of THV 220A and $Al_2O_3$ materials were made with both the unmodified powder and powder modified with two parts per hundred by weight (pph) NZ12.

The pycnometer density of the $Al_2O_3$ was measured using the lab Accupyc helium displacement pycnometer and determined to be 3.974 g/cc. The press density of the $Al_2O_3$ was measured using the lab Buhler metallurgical press and 1 inch diameter cylindrical press die. The press density was found to be 2.556 g/cc which was followed by calculation of the packing fraction of $Al_2O_3$, found to be 64.3%.

The NZ12 was first dissolved in isopropanol (IPA) and then added to the $Al_2O_3$. Additional IPA was added to make the mixture a slurry. The IPA, NZ12, $Al_2O_3$ mix was blended using a rotating stock pot (discussed above) and heated to ~95° C. via a heat gun to boil off the excess IPA. Once cooled, the modified particle pycnometer density was determined to be 3.834 g/cc.

Next both coated and uncoated $Al_2O_3$ powder was compounded into Dyneon THV220A using lab 19 mm twin screw compounder. The proper ratio of polymer and particulate was controlled by using two KTron K20 gravimetric weight loss feeders. Feed rates were calculated based on the feeder maximum feed rates and the desired material composition with a target throughput rate of 39 cc/min. All samples were run with the same screw configuration and the same temperature profile of all zones at 185° C. and were run with a 19 hole die. All samples were cut into pellets at the die face for extrusion and were air cooled. Based on the packing fraction of the $Al_2O_3$ powder, a target particulate loading of 60 vol % was chosen. This 60 vol % particles target was maintained for the modified and unmodified samples with the understanding that the continuous phase for the modified composite was made up of NZ12 coating and THV 220A. Therefore the modified sample would have slightly less THV 220A by volume than the uncoated. The modified $Al_2O_3$ sample ran at 50% of the maximum torque and the melt pressure varied between 410 psi to 530 psi again increasing as the run ended. Press density of this material was 3.07 g/cc as compounded with a calculated particle loading of 57.3 vol %. The unmodified $Al_2O_3$ ran at between 65% and 70% of the max torque with melt pressures ranging from 540 psi to 580 psi again highest at the end of the run as material coated the interior of the die and outer holes plugged. Press density of this material was 3.11 g/cc as compounded with a calculated particle loading of 58.6 vol %.

The unmodified $Al_2O_3$ ran through the extruder at a motor load of 12.0 amps. This material was stiff. The modified $Al_2O_3$ ran through the extruder at a high observed motor load of 11.0 amps. Again the motor load climbed to the highest observed value but unlike the unmodified materials which climbed steadily, the interfacially modified material motor load fluctuated up and down but overall climbed up to the maximum. This material was more flexible than the unmodified materials.

Three ASTM 638 type-4 dog bones were cut of each material using the lab ASTM-638-4 punch and Buhler metallurgical press. Each sample was tested with a cross head speed of 1-inch per minute in a linear tensile test and pulled to failure with a 1-inch gauge length. The tensile properties were also different with the modified material having a 20 times smaller tensile yield strength of 0.3 MPa compared to the unmodified 6.8 MPa and a 25 times longer extension at failure of 600% elongation compared to the unmodified 20% elongation on a one inch gage length Table 2 below summarizes the compounded properties of all three materials produced. FIG. 1 shows the results of the tensile testing on the materials produced in this experiment.

TABLE 2

Composition, compounding, extrusion and tensile data for modified and unmodified $Al_2O_3$ in THV composite.

| Example | 2c | 2d |
|---|---|---|
| wt % THV 220A [1.9 g/cc] | 24.3% | 25.3% |
| wt % $Al_2O_3$ [3.974 g/cc] | 74.2% | 74.7% |
| wt % Coating [1.388 g/cc] | 1.5% | 0.0% |
| vol % THV 220A [1.9 g/cc] | 39.4% | 41.4% |
| vol % $Al_2O_3$ [3.974 g/cc] | 57.4% | 58.6% |
| vol % Coating [1.388 g/cc] | 3.3% | 0.0% |
| Compounder Torque [% max] | 50% | 65-70% |
| Compounder Pressure [psi] | 410-530 | 540-580 |
| Extruder Motor Load [amps] | 11.0 | 12.0 |
| Puck Density [g/cc] | 3.07 | 3.11 |
| Calculated Target Density [g/cc] | 3.13 | 3.14 |
| Deviation from Target | 1.72% | 0.93% |
| Physical properties of extruded 3 × 20 mm strip ASTM 638-4 dog bones | | |
| Tensile Stress at Yield [Mpa] | 0.31 | 6.84 |
| Elongation at Yield [in.] | 0.05 (5%) | 0.13 (13%) |
| Maximum Tensile Stress [Mpa] | 1.11 | 6.86 |
| Elongation at Break (Max) [in.] | 5.96 (596%) | 0.23 (23%) |

The composites of the invention can be used in a number of applications that use either the properties of the particulate in the composite or the overall viscoelastic properties of the composite. The viscoelastic materials can be formed into objects using conventional thermoplastic polymer forming techniques including extrusion, injection molding, compression molding, and others. The composites of the invention can be used in many specific applications such as in transportation (including automotive and aerospace applications), abrasive applications used to either remove materials such as paint or corrosion or dirt or stains, uses where high density (6 to 17 $g \cdot cm^{-3}$) or low density (0.2 to 2 $g \cdot cm^{-3}$) is useful, hunting and fishing applications or in mounting applications where a base or mounting weight is needed. Specific applications include fishing lure and jig, abrasive pads with aluminum oxide, silica or garnet used like sand paper or sanding blocks, abrasive pads with cleaning materials used like Scothbright® pads for cleaning surfaces, brake pads (aluminum oxide or garnet), apex seals for Wankel® or rotary engines, fuel applications (line, tank or seal), engine or drive train counterweight, automotive or truck wheel weight.

A ceramic composite and polymer composite comprises about 30 to 87 vol % of a ceramic particulate having a particle size greater than about 5 microns having a coating of about 0.005 to 5 wt-% of an interfacial modifier (IM), the percentage based on the composite; and a polymer phase. The IM can be used at about 0.01 to 3 wt-%, about 0.05 to 2 wt-% or about 0.02 to 1.8 wt-% of an interfacial modifier; and a polymer phase. In certain aspects the composite can have a tensile strength of about 0.1 to 30 times about 2 to 30 times about 0.1 to 30 times, or 0.2 to 15 times that of the base polymer. Similarly in certain applications the composite can have a tensile elongation of about 5% to 100%, about 8% to 100% or about 10% to 100% of the base polymer.

The composite has combination of a tensile strength of about 10 to 20 time that of the base polymer and a tensile elongation of about 15% and 90% of base polymer and can have a shear of at least 5 or 10 sec$^{-1}$ and can have a tensile strength of at least 0.2, 0.8 or 1 Mpa. Ineffectively loaded composite, the composite can comprise greater than the 30 volume percent or 50 volume percent of the ceramic particulate. But articulate and have a particle size distribution of about 5 to 2000μ or 10 to 1000μ or 10 to 500μ or 10 to 200μ, 5 to 250μ or 10 to 150μ well dispersed in the polymer phase. In certain applications the particle size distribution can fall within 5 to 150 microns. The composite can comprise a mixed particulate wherein the ceramic composite has a particle size $P_S$ of about 10 to 200 microns and the composite additionally comprises a particulate with a second particle size $P_S^1$ that differs from $P_S$ by at least 5 microns, alternatively the composite has a mixed particle size according to the formula $P_S \geq 2P_S^1$ or $P_S \leq 0.05 P_S^1$. The next particulate can comprise, in addition to the ceramic particle, a variety of particulate including metallic, nonmetallic, hollow glass series, solid glass spheres, inorganic minerals, etc. and mixtures thereof. The composite of claim 1 wherein the particle comprises a ceramic having a particle size ($P_s$) of greater than about 10 microns, a circularity of the ceramic particle is 12.5 to 50, 14 to 50, 18 to 45 or 20 to 45. The second particulate comprises a circularity of greater than 14 and a density less than 0.9 gm-cm$^{-3}$, or a hollow glass sphere having a particle size ($P_s$) of about 10 to 300 microns or a solid glass sphere having a particle size ($P_s$) of about 10 to 200 microns, or a silica having a particle size ($P_s$) of about 75 to 300 microns. The polymer can comprise a fluoropolymer, a fluoro-elastomer, a polyamide, a nylon, a poly(ethylene-co-vinyl acetate), a synthetic rubber, a polyvinyl chloride, a polyolefin (including a high density polyolefin) such as a polyethylene (including a HDPE) a polypropylene or other such polymers or mixtures. The particles can have a coating of about 0.01 to 3 wt % of an interfacial modifier based on the composite. The particles have an excluded vol. of about 13 vol.-% to about 70 vol.-%, or about 13 vol.-% to about 60 vol.-%.

The composite can contain a organic or inorganic pigment, or an organic fluorescent dye.

A particulate polymer composite comprising a ceramic particle in a polymer phase, the composite comprises about 90 to 40 volume-% of a ceramic particle, having a density greater than 0.10 gm-cm$^{-3}$ and less than 5 gm-cm$^{-3}$, a particle size greater than 5 microns, a circularity greater than 12.5, 14 or 20 and an aspect ratio less than 9 or 3; and about 10 to 70 volume-% of a polymer phase; wherein the particle has an IM coating that is 0.2 to 1 microns thick comprising about 0.005 to 3 wt.-% of an interfacial modifier, based on the composite; and the composite density is less than 10 gm-cm$^{-3}$, about 0.4 to 5 gm-cm$^{-3}$, or about 0.9 to 10 gm-cm$^{-3}$, about 1 to 8 gm-cm$^{-3}$ or about 1.5 to 6 gm-cm$^{-3}$ A shaped article comprises the composite having about 87 to 48 volume-% of a particulate having a particle size greater than 10 microns, and having a particle size distribution having at least 10 wt.-% of a particulate within about 10 to 100 microns, at least 10 wt.-% of the polymer particulate within about 10 to 500 microns, a circularity greater than 13 and an aspect ratio less than 1:3; about 13 to 51 volume-% of a polymer phase.

While the above specification shows an enabling disclosure of the composite technology of the invention, other embodiments of the invention may be made without departing from the spirit and scope of the invention. Accordingly, the invention is embodied in the claims hereinafter appended.

We claim:

1. A thermoplastic composite with improved viscoelastic properties comprising a shaped article comprising a melt blended ceramic particle in a polymer phase, the composite comprising:
   (a) a ceramic particle, having a density greater than 0.10 gm-cm$^{-3}$ and less than 10 gm-cm$^{-3}$; and
   (b) about 13 to 51 vol. % of a thermoplastic polymer phase;
   wherein the ceramic particulate comprises a particle size $P_s$ of about 10 to 500 microns and the composite comprises a second particulate with a second particle size $P_s^1$ that differs from $P_s$ by at least 5 microns, the particulate has an exterior coating comprising about 0.005 to 3 wt.-% of an interfacial modifier, based on the composite; and the composite density is about 0.9 to 10 gm-cm$^{-3}$;
   wherein the thermoplastic composite is free of a polymer consisting of tetrafluoroethylene, the ceramic particulate having a circularity greater than 12.5 and an aspect ratio less than 1:9.

2. The thermoplastic composite of claim 1 wherein the polymer comprises a polyamide.

3. The thermoplastic composite of claim 1 wherein the polymer comprises a nylon.

4. The thermoplastic composite of claim 1 wherein the polymer comprises a poly(ethylene-co-vinyl acetate).

5. The thermoplastic composite of claim 1 wherein the polymer comprises a polyvinyl chloride.

6. The thermoplastic composite of claim 1 wherein the polymer comprises a thermoplastic fluoropolymer.

7. The thermoplastic composite of claim 1 wherein the polymer comprises a polyolefin.

8. The thermoplastic composite of claim 1 wherein the polymer comprises a thermoset polymer.

9. The thermoplastic composite of claim 1 wherein the polymer comprises a high-density polyolefin.

10. The thermoplastic composite of claim 1 wherein the particulate comprises a coating comprising about 0.01 to 4 wt % of an interfacial modifier based on the composite.

11. The thermoplastic composite of claim 1 wherein the particle has an excluded volume of about 13 vol.-% to about 70 vol.-%.

12. The thermoplastic composite of claim 1 wherein the particle has an excluded volume of about 13 vol.-% to about 60 vol.-%.

13. The thermoplastic composite of claim 1 wherein the polymer comprises a thermoplastic fluoroelastomer.

14. The shaped article of claim 1 wherein the article is a transportation bumper, a commercial or residential weather strip, an abrasive layer, a vapor resistant hose, a transportation interior panel, a sealant for a fenestration unit or installation, a structural member for a sound box, a transportation brake pad, engine or drive train counterweight, automotive or truck wheel weight, an LED heat dissipation fixture, a refrigeration unit thermal seal, or a fenestration composition.

15. The shaped article of claim 1 wherein the composite material can be formed into objects using conventional thermoplastic polymer forming techniques.

16. The shaped article of claim 15 wherein the thermoplastic forming techniques comprises extrusion, injection molding, or compression molding.

* * * * *